(12) United States Patent
Carbone

(10) Patent No.: US 12,508,332 B2
(45) Date of Patent: Dec. 30, 2025

(54) SANITIZING LIGHT ASSEMBLY AND CONVEYOR SYSTEM

(71) Applicant: Frank Louis Carbone, Irvine, CA (US)

(72) Inventor: Frank Louis Carbone, Irvine, CA (US)

( * ) Notice: Subject to any disclaimer, the term of this patent is extended or adjusted under 35 U.S.C. 154(b) by 0 days.

(21) Appl. No.: 17/313,556

(22) Filed: May 6, 2021

(65) Prior Publication Data

US 2022/0047751 A1 Feb. 17, 2022

Related U.S. Application Data

(63) Continuation of application No. 17/176,127, filed on Feb. 15, 2021.

(60) Provisional application No. 63/065,870, filed on Aug. 14, 2020.

(51) Int. Cl.
| | |
|---|---|
| *A61L 2/10* | (2006.01) |
| *A61L 2/08* | (2006.01) |
| *A61L 2/26* | (2006.01) |
| *B65B 35/24* | (2006.01) |
| *B65B 55/02* | (2006.01) |
| *B65B 55/16* | (2006.01) |
| *B65G 15/30* | (2006.01) |
| *B65G 49/00* | (2006.01) |

(52) U.S. Cl.
CPC ........ *A61L 2/10* (2013.01); *A61L 2/08* (2013.01); *A61L 2/26* (2013.01); *B65B 35/24* (2013.01); *B65B 55/027* (2013.01); *B65B 55/16* (2013.01); *B65G 15/30* (2013.01); *B65G 49/00* (2013.01); *A61L 2202/11* (2013.01); *A61L 2202/122* (2013.01); *A61L 2202/23* (2013.01)

(58) Field of Classification Search
None
See application file for complete search history.

(56) References Cited

U.S. PATENT DOCUMENTS

| | | | |
|---|---|---|---|
| 3,179,117 A * | 4/1965 | Gibson | ........... B60P 3/00 134/107 |
| 4,396,110 A * | 8/1983 | Christensen | ........... B65G 15/24 403/163 |
| 6,433,344 B1 | 8/2002 | Salisbury | |
| 6,962,033 B2 | 11/2005 | Guzman | |
| 7,067,089 B2 | 6/2006 | Wen | |
| 7,160,566 B2 * | 1/2007 | Fink | ........... A23B 2/50 426/399 |

(Continued)

FOREIGN PATENT DOCUMENTS

| | | | | |
|---|---|---|---|---|
| CA | 2777014 A1 | 4/2011 | | |
| CN | 108450974 A * | 8/2018 | ........... | A23L 19/09 |

(Continued)

*Primary Examiner* — James Choi
(74) *Attorney, Agent, or Firm* — Jafari Law Group, Inc.

(57) ABSTRACT

The invention relates generally to a sanitizing device that may comprise of an enclosure, a conveyor module, a plurality of sanitizing light sources, and possibly a sealing module. Objects that need to be sanitized may be transported or placed inside the enclosure and can be exposed to sanitizing lights from a plurality of sanitizing light sources. After the exposure to the sanitizing lights, the objects may convey out of the apparatus or go through a sealing module before exiting the enclosure. The conveyor module of the sanitizing device may be driven by torque created by an exterior conveyor belt or a motorized mechanism integrated within the apparatus.

17 Claims, 16 Drawing Sheets

(56) References Cited

U.S. PATENT DOCUMENTS

| | | |
|---|---|---|
| 8,203,124 B2 | 6/2012 | Havens |
| 2002/0055803 A1 | 5/2002 | Stork |
| 2006/0147339 A1 | 7/2006 | Hunter |
| 2007/0012340 A1* | 1/2007 | Jones .................. A61L 2/10 |
| | | 134/131 |
| 2008/0302607 A1* | 12/2008 | Kaplan ................ A47F 9/04 |
| | | 186/61 |
| 2009/0252646 A1 | 10/2009 | Holden |
| 2011/0308917 A1* | 12/2011 | Lathem ................ A61L 2/10 |
| | | 250/492.1 |
| 2018/0343898 A1* | 12/2018 | Alzeer ................. A23L 3/28 |
| 2019/0070324 A1* | 3/2019 | Hardin ............... A61L 2/084 |

FOREIGN PATENT DOCUMENTS

| | | | |
|---|---|---|---|
| DE | 202020101812 U1 | * | 5/2020 |
| JP | S6081430 A | * | 5/1983 |
| JP | 2006086483 A | * | 3/2006 |
| JP | 2002080017 A | | 6/2006 |
| KR | 20060000109 U | | 12/2006 |

\* cited by examiner

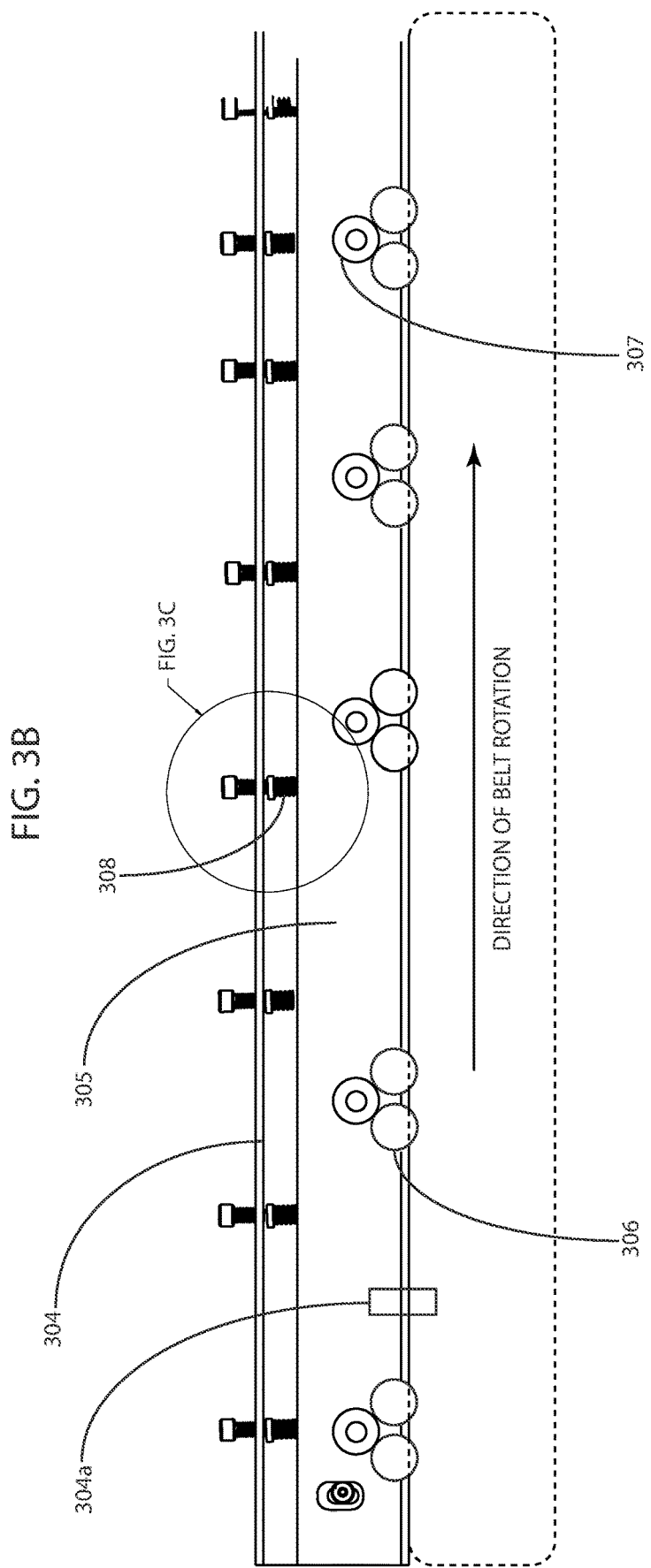

SANITIZING LIGHT ASSEMBLY AND CONVEYOR SYSTEM

PRIORITY NOTICE

The present application is a Continuation of Non-Provisional patent application with Ser. No. 17/176,127, filed on Feb. 15, 2021, which claims priority under 35 U.S.C. § 119 to U.S. Provisional Patent Application with Ser. No. Filing 63/065,870 filed on Aug. 14, 2020, the disclosure of which are incorporated by reference in their entirety.

TECHNICAL FIELD OF THE INVENTION

The present disclosure relates generally to a sanitizing device that may comprise of an enclosure, a conveyor module, a plurality of sanitizing light sources, and possibly a sealing module to sanitize objects that are placed inside the apparatus.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever. Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Electromagnetic light emitted at a certain wavelength range may have the effect of sanitizing and disinfecting the surface of an object that is exposed to the emission. As a result, there are germicidal or sanitizing devices that use electromagnetic light as a tool for sanitizing objects that have bacteria or viruses on their surface.

Some devices even have an enclosure and a conveyor module where the objects may be transported through the enclosure to be exposed to the electromagnetic light sources. For example, U.S. Pat. No. 7,067,089 B2 discloses an apparatus for sanitizing a plurality of articles, which comprises an enclosure enclosing a sanitizing zone and at least one ultraviolet irradiating source. Furthermore, U.S. Patent Application US20090252646A1 discloses enclosures that include light generating sterilization sources and conveying systems for sterilizing.

However, these prior art devices have several shortcomings. For example, these devices are generally part of large assembly lines in manufactory settings. Thus, those devices are not easily modified for other uses with existing conveyor systems, nor are those devices easily transportable.

Therefore, there is a need for a sanitizing assembly that addresses the prior art shortcomings and has other advantages over the current state of the art. It is to these ends that the present invention has been developed.

SUMMARY OF THE INVENTION

To minimize the limitations in the prior art, and to minimize other limitations that will be apparent upon reading and understanding the present specification, the present invention describes a device that serves as an assembly line for objects to travel through and be sanitized by sanitizing light sources and possibly be covered and sealed by a sealing material to preserve the cleanliness of the objects.

Generally, the invention is a sanitizing assembly that may be comprised of a shroud or enclosure, a conveyor module, a plurality of sanitizing light sources, and possibly a sealing module. Objects that need to be sanitized may be transported or placed inside the enclosure and can be exposed to electromagnetic waves from a plurality of sanitizing light sources. The objects that need to be sanitized may be any organic or inorganic object that fits inside the enclosure. The conveyor module of the invention may transport the objects through the inside of the enclosure where the objects get exposed to a plurality of sanitizing light sources. The conveyor belt of the conveyor module may be transparent or semi-transparent to allow additional sanitizing light sources situated in-between the conveyor belt to sanitize the bottom of the objects. Also, the conveyor module of the sanitizing device may be driven by torque created by an exterior conveyor belt or a motorized mechanism integrated within the apparatus. After the sanitization process, the objects may possibly go through a sealing process where the invention encapsulates and seals the sanitized objects and detach them from the rest of the sealing material.

A sanitizing assembly, in accordance with some embodiments of the present invention, may include: an enclosure with an inlet and an outlet opposite longitudinal ends of the enclosure, the enclosure including a top shell removably coupled to a bottom shell; a power supply module secured inside the enclosure for supplying power to one or more devices; a conveyor module secured to and entirely contained inside the bottom shell of the enclosure, including a conveyor belt adapted to move objects between the inlet and the outlet of the enclosure; and a light-emitting module secured to and entirely contained inside the enclosure, the light-emitting module adapted to disperse a sanitizing light onto the objects moved between the inlet and the outlet of the enclosure.

A sanitizing assembly, in accordance with some embodiments of the present invention, may include: an enclosure with an inlet and an outlet opposite longitudinal ends of the enclosure, the enclosure including a top shell removably coupled to a bottom shell; a power supply module secured inside the enclosure for supplying power to one or more devices; a conveyor module secured to and entirely contained inside the bottom shell of the enclosure, including a conveyor belt adapted to move objects between the inlet and the outlet of the enclosure; a light-emitting module secured to and entirely contained inside the enclosure, the light-emitting module adapted to disperse a sanitizing light onto the objects moved between the inlet and the outlet of the enclosure, wherein the light-emitting module includes a plurality of sanitizing light-emitting lamps situated on the top shell of the enclosure and directly above the conveyor belt of the conveyor module or on the bottom shell of the enclosure and directly below the conveyor belt of the conveyor module; and a sealing module adjacent to the conveyor module and housed entirely inside the enclosure, the sealing module adapted to wrap a portion of a sealing material over the objects after the objects are exposed to the sanitizing light and expel a sealed sanitized object from the enclosure.

A sanitizing assembly, in accordance with some embodiments of the present invention, may include: an enclosure with an inlet and an outlet opposite longitudinal ends of the enclosure, the enclosure including a top shell removably coupled to a bottom shell; a power supply module secured inside the enclosure for supplying power to one or more devices; a conveyor module secured to and entirely contained inside the bottom shell of the enclosure, including a conveyor belt adapted to move objects between the inlet and the outlet of the enclosure; a light-emitting module secured to and entirely contained inside the enclosure, the light-emitting module adapted to disperse a sanitizing light onto the objects moved between the inlet and the outlet of the enclosure; and a sealing module adjacent to the conveyor module and housed entirely inside the enclosure, the sealing module adapted to wrap a portion of a sealing material over the objects after the objects are exposed to the sanitizing light and expel a sealed sanitized object from the enclosure.

A sanitizing assembly, in accordance with some embodiments of the present invention, may include: an enclosure with an inlet and an outlet opposite longitudinal ends of the enclosure, the enclosure including a top shell coupled to a bottom shell; a conveyor module secured to and entirely contained inside the bottom shell of the enclosure, including a conveyor belt adapted to move objects between the inlet and the outlet of the enclosure; a conveyor interface for coupling the conveyor module to an external conveyor system, the conveyor interface adapted to drive the conveyor belt of the conveyor module from a force exerted by the external conveyor system; and a light-emitting module secured to and entirely contained inside the enclosure, the light-emitting module adapted to disperse a sanitizing light onto the objects moved between the inlet and the outlet of the enclosure.

As may be appreciated by those skilled in the art, a system and device in accordance with the present invention may be utilized not only for sanitizing purposes, but also for other purposes involving the need for exposing objects to electromagnetic light, sealing objects, set in motion a conveyor module using an exterior conveyor belt, or other disclosures and functions that are specified herein, all within a single continuous flow embodiment.

Various objectives and advantages of the present invention will become apparent from the following description taken in conjunction with the accompanying drawings wherein are set forth, by way of illustration and example, certain embodiments of this invention. The drawings submitted herein constitute a part of this specification, include exemplary embodiments of the present invention, and illustrate various objects and features thereof.

BRIEF DESCRIPTION OF THE DRAWINGS

The sanitizing assembly as disclosed herein is further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 3B illustrates the longitudinal cross-sectional view of a conveyor module.

DETAILED DESCRIPTION OF THE INVENTION

Figure 1:
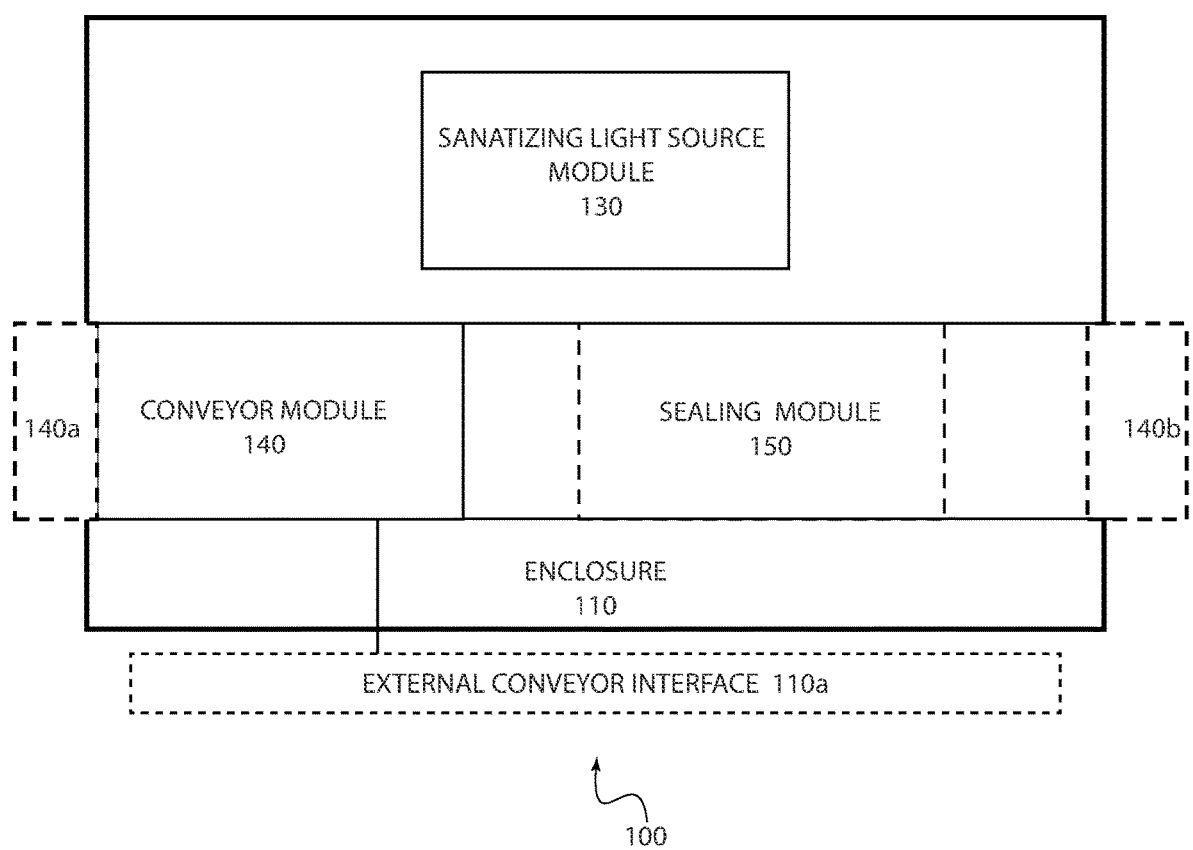
FIG. 1 illustrates a block diagram showing the broad scope of components that are essential to the functioning of the apparatus.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates generally to a sanitizing assembly 100 that may be comprised of an enclosure for housing a conveyor module, a plurality of sanitizing light sources, and optionally a sealing module. Objects that need to be sanitized may be transported or placed inside the enclosure to receive exposure to electromagnetic lights from a plurality of sanitizing light sources. Generally, the objects that need to be sanitized may be any organic or inorganic objects that fit inside the enclosure. A "sanitizing light source" may be any electromagnetic light or radiant energy source that is within the wavelength range of sanitizing and disinfecting objects from bacteria and viruses. After being exposed to the sanitizing lights, the objects may convey out of the apparatus or go through a sealing module 150 before exiting the enclosure 110. The conveyor module 140 of the sanitizing device may be driven by torque created by an exterior conveyor belt or a motorized mechanism integrated within the apparatus.

Turning now to the figures, FIG. 1 illustrates a block diagram showing the broad scope of components that may facilitate the functioning of a system in accordance with exemplary embodiments of the present invention, wherein optional or alternative components are shown in dotted lines. Generally, a system in accordance with the present invention includes a sanitizing assembly 100 comprising of an enclosure 110, conveyor module 140, and sanitizing light sources module (sanitizing module 130). In exemplary embodiments, sanitizing module 130 may be situated inside of enclosure 110 wherein the sanitization and or disinfection process takes place. The enclosure 110 may have an inlet 140*a* and an outlet 140*b* for objects to enter and exit the enclosure 110. The objects requiring sanitization may be placed on a conveyor of the conveyor module 140 in order to travel through the inside of the enclosure 110 and be exposed to sanitizing light emitted from sanitizing module 130 thereby disinfecting the objects.

In one exemplary embodiment, the conveyor module 140 may move the objects from the exterior of the enclosure 110 to the interior of the enclosure 110 to be disinfected by way of a conveyor that may extend outside of the enclosure. In another exemplary embodiment, the whole conveyor module 140 may be inside the enclosure 110 and objects may be placed on the conveyor module 140 through an inlet 140*a* that excludes a portion of the conveyor. The sanitizing assembly 100 may also include a sealing module 150 where the sanitized objects can be covered, encapsulated, or sealed by a sealing material 407 to preserve the objects' cleanliness. The sealing apparatus may also comprise of a mechanism to trim and detach the sealed object from the rest of the sealing material 407. When the objects are sanitized by a sanitizing light emitted from the sanitizing module 130, and possibly covered, encapsulated, or sealed, they exit the enclosure 110 through an exit outlet 140*b*.

In some exemplary embodiments, as shown, system 100 may further include an external conveyor interface 110*a* coupled to a portion of the enclosure 110, which allows the conveyor module 140 to use an external source to power or drive a conveyor belt of the conveyor module. For example, and without limiting the scope of the present invention, interface 110*a* may be a conveyor interface for coupling the conveyor module 140 to an external conveyor system such as a conveyor system of a cash register commonly found in supermarkets, retail stores, or convenience stores, wherein the conveyor interface is adapted to drive the conveyor belt of the conveyor module 140 from the force exerted by the external conveyor system of the cash register. Interface 110*a* may therefore facilitate an efficient integration of assembly 100 with an existing conveyor system without requiring modifications to the external system or disrupting the original conveyor flow of the existing conveyor system.

Figure 1A:
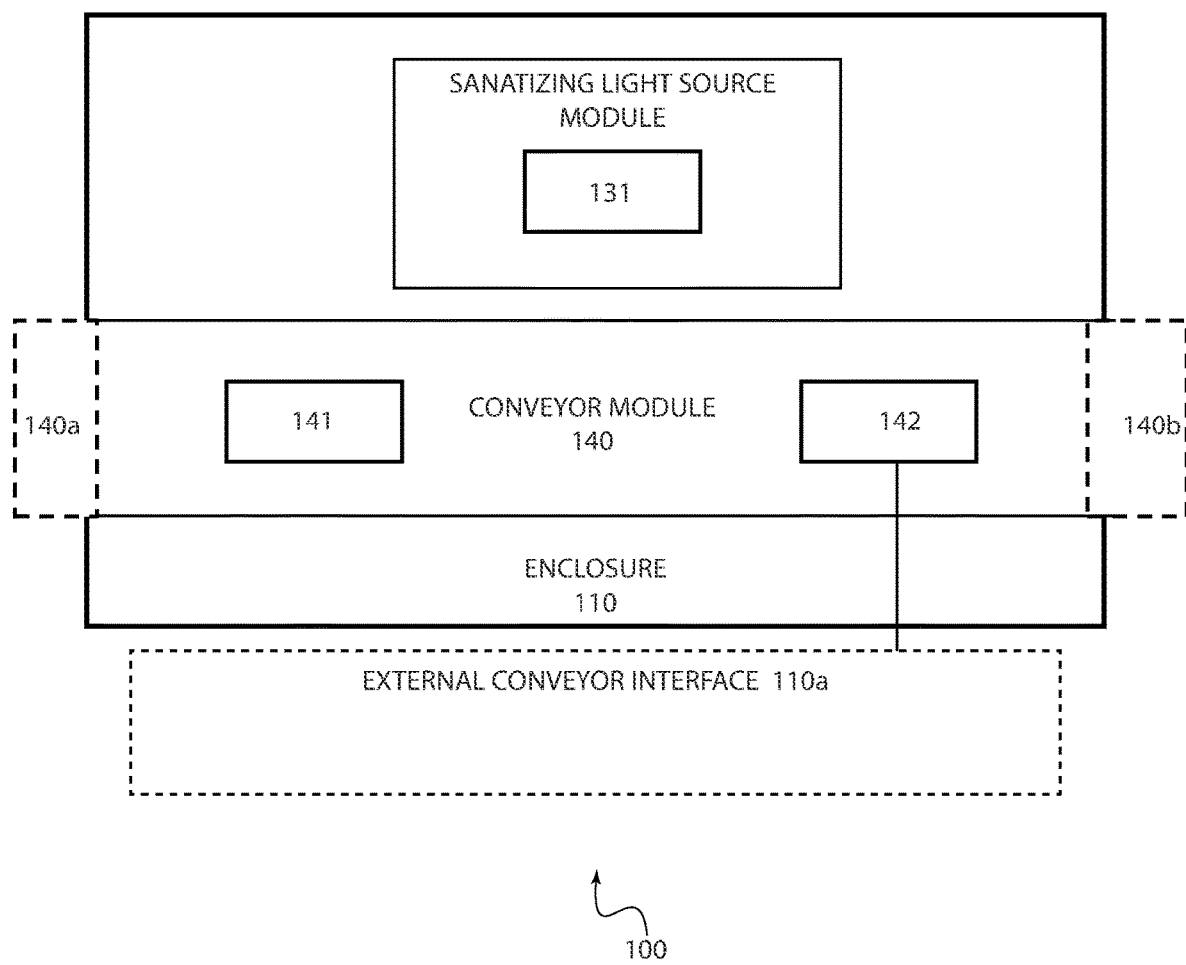
FIG. 1A illustrates a block diagram showing an embodiment of the apparatus that discloses one variation of the invention's important components.

Turning now to the next figure, FIG. 1A illustrates a block diagram showing one exemplary embodiment of the present invention. In this embodiment, enclosure 110 houses a sanitizing module 130 and at least part of the conveyor module 140 but excludes sealing module 150. In this embodiment, conveyor module may include a conveyor drive mechanism 141 and a conveyor support mechanism 142, which in some embodiments may comprise of or be integral with an external conveyor interface 110a—in which case the conveyor drive mechanism 141 may be connected to an exterior conveyor belt. In such embodiments, the conveyor drive mechanism 141 may convert the motion of the exterior conveyor belt into the necessary torque needed for a conveyor belt of the conveyor module 140 to move the objects through the sanitizing assembly 100. In one exemplary embodiment of the invention, some of the components that comprise the conveyor drive mechanism may include, but are not limited to, a conveyor belt 143, conveyor rollers 301, conveyor pulley wheels 307, and torque transfer wheels 306. In one exemplary embodiment of the invention, some of the components that comprise the conveyor support mechanism may include, but not limited to, a conveyor enclosure 201, conveyor support subassembly 302, pulley pressure blocks 305, pulley support channel 304, and springs 308. The conveyor module 140 may also extend to the outside of the enclosure to transport objects to the inside of the enclosure.

The enclosure may also house the sanitizing module 130. In one exemplary embodiment of the invention, the placement of the sanitizing light sources may be divided to sanitizing light sources between conveyor belt sections and sanitizing light sources attached inside of enclosure and above the conveyor belt. The sanitizing light sources between conveyor belt 131 may be attached in between the part of the conveyor module 140 that is enclosed by the enclosure. The sanitizing light sources attached inside of enclosure 132 may be mounted on the inside top and side surfaces of the enclosure.

Figure 1B:
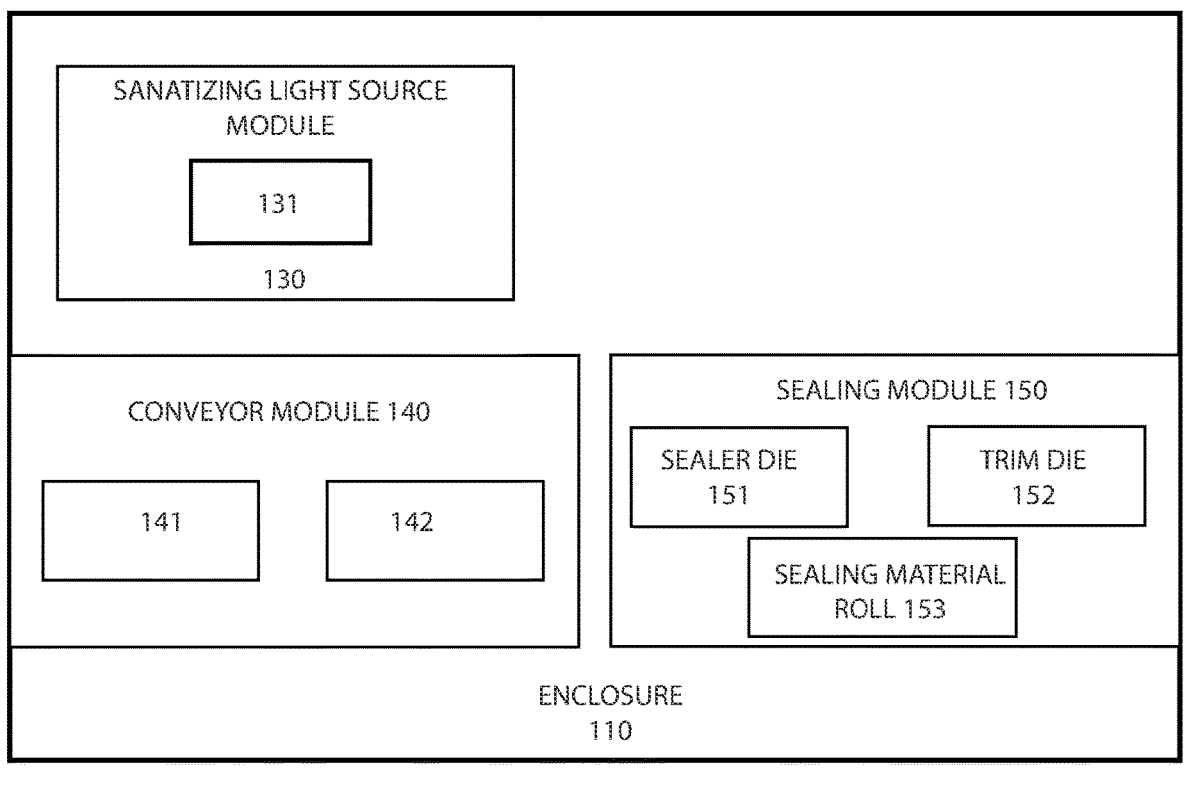
FIG. 1B illustrates a block diagram showing another embodiment of the apparatus that discloses a variation of the invention's important components.

Turning now to the next figure, FIG. 1B illustrates a block diagram showing another embodiment of the apparatus that discloses a variation of the invention's components in accordance with exemplary embodiments of the present invention. The figure shows the invention having an enclosure 110 that houses sanitizing module 130, conveyor module 140, and a sealing module 150. In this embodiment, conveyor module 140 may have components for the conveyor drive for conveyor belt 144 and components for conveyor drive for sealing module 145. The conveyor drive for conveyor belt 144 set the conveyor belt 143 in motion, which also moves the objects through the sanitizing module 130. In one exemplary embodiment of the invention, some of the components that comprise the conveyor drive for conveyor belt 144 may include, but not limited to, a conveyor belt 143, at least one motorized conveyor roller 601, at least one generic conveyor roller, and other essential components needed to set a conveyor module in motion. The conveyor drive for the sealing module 145 sets the sealing material 407 for the sealing module 150 in motion. The conveyor drive for the sealing module 145 also moves the sanitized objects through the sealing module 150. In one exemplary embodiment of the invention, the sanitized objects are laid on top and under the layers of sealing material 407 attached to the conveyor drive for the sealing module 145, where there is enough static friction between the surfaces for the conveyor drive for the sealing module 145 to move the sanitized objects through the sealing module 150. In one exemplary embodiment of the invention, some of the components that comprise the conveyor drive for the sealing module 145 may include, but not limited to, upper sealer motorized roller 611, lower sealer motorized roller 602, upper stabilization conveyor 607, and other essential components needed to set a conveyor module in motion.

The enclosure 110 may also house the sanitizing module 130. In one exemplary embodiment of the invention, the placement of the sanitizing light sources may be divided to sanitizing light sources between conveyor belt 131 and sanitizing light sources attached inside of top bottom shell 401. The sanitizing light sources between conveyor belt 131 may be attached in between the part of the conveyor module 140 that is enclosed by the enclosure 110. The sanitizing light sources attached inside of bottom shell 401 may be mounted on the inside top and side surfaces of the enclosure 110.

The sealing module 150 may be comprised of a sealer die 151, trim die 152, and sealing material roll 153. The sealer die 151 may enclose and vacuum-seal the sanitized objects with a sealing material 407. In one exemplary embodiment of the invention, some of the components that comprise the sealer die 151 may include, but not limited to, upper sealer die 609, lower sealer die 603, die actuator 608, and other essential components needed to seal objects. The trim die 152 may cut and detach the sealed object from the rest of the sealing material 407 attached to it. In one exemplary embodiment of the invention, some of the components that comprise the trim die 152 may include, but not limited to, upper trim die 610, sponge platen (upper), lower trim die 604, die actuator 608, and other essential components needed to trim objects. The sealing material roll 153 may be the rollers that contain and support the sealing material 407. In one exemplary embodiment of the invention, the sealing material 407 may be thermoplastic, and the sealer die 151 may be a heat-sealing module. In one exemplary embodiment of the invention, some of the components that comprise the sealing material roll may include, but not limited to, upper sealer roll 606, lower sealer roll 605, upper stabilization conveyor 607, and other essential components needed to seal objects.

Figure 2A:
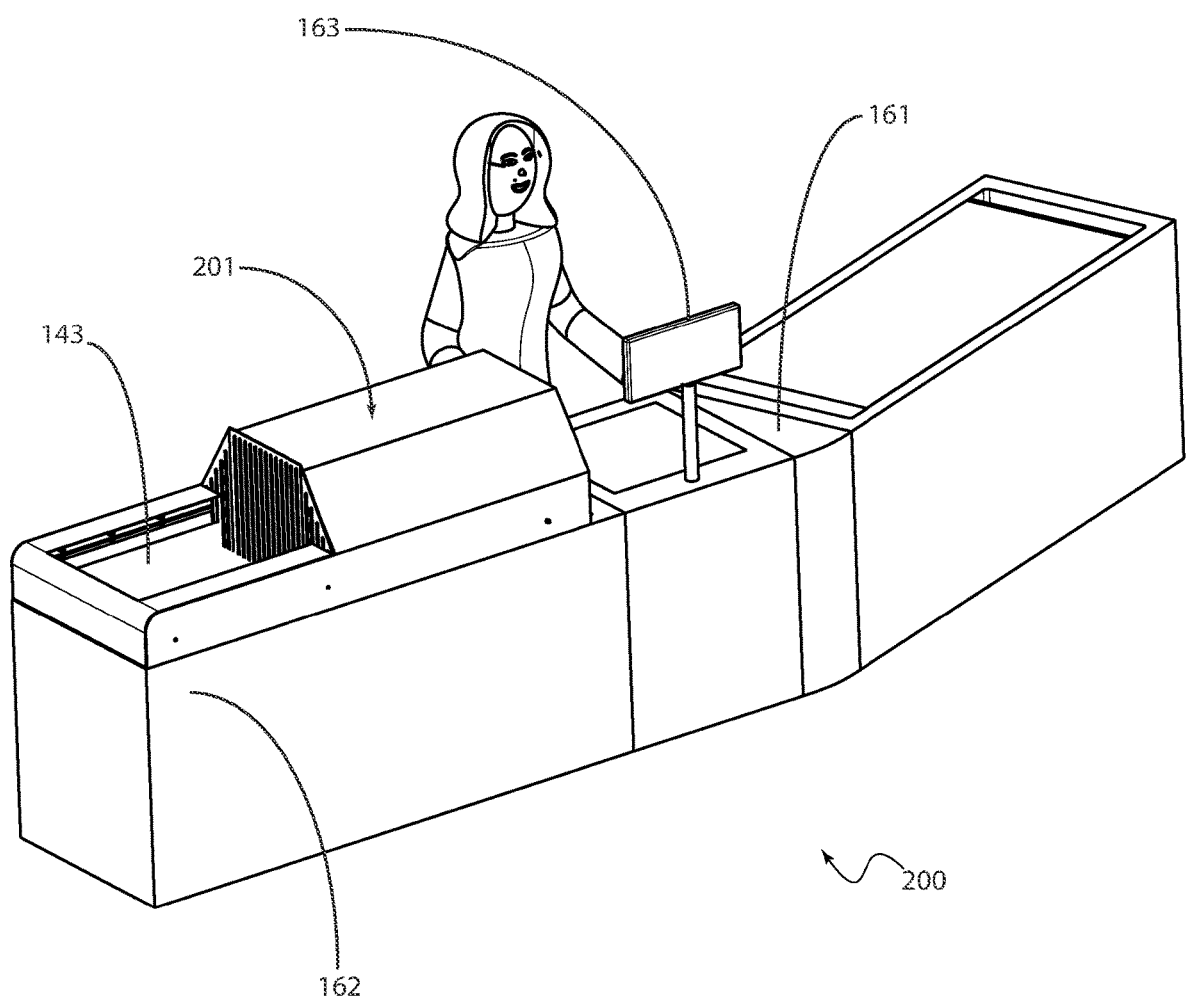
FIG. 2A illustrates the outside view of one embodiment of the sanitizing assembly that can be installed on top of an exterior conveyor belt.

Turning now to the next figure, FIG. 2A illustrates the outside view of one embodiment of the sanitizing assembly 100 that can be installed on top of an existing or external conveyor belt. For example, and without limiting the scope of the present invention, sanitizing assembly 100 may be installed on a cash register system 200, which may include a counter 161 and a conveyor 162 that drives a sanitizing assembly 100 installed on top of the conveyor 162, and a cash register 163. The sanitizing assembly 100 may be adjusted and placed on top of the external conveyor belt used for transferring organic or inorganic objects. Examples of exterior conveyor belts may include, but not limited to, conveyor belts used in grocery stores and department stores to transfer products to the cashier, conveyor belts used in warehouses and factories to transfer goods to a predetermined destination, or any conveyor belt transporting system that requires the objects placed on top of it to be sanitized. The motion of the exterior conveyor belt may drive the conveyor belt 143 of the sanitizing assembly 100. In this figure, the invention's conveyor module 140 is designed to receive objects from the exterior of the enclosure 201 and transfer them inside the enclosure 110 where sanitization, and possibly sealing, would take place.

Figure 2B:
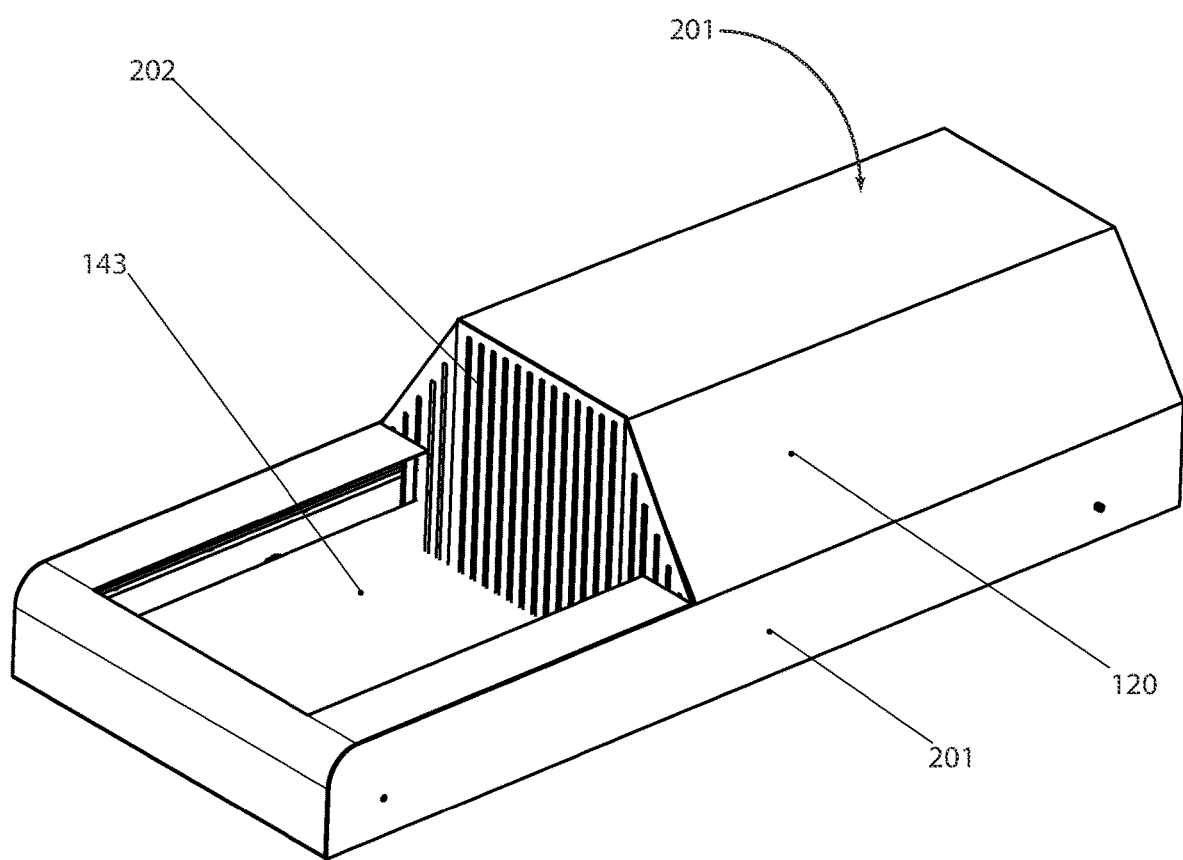
FIG. 2B illustrates a close-up view of the outside view of one embodiment of the sanitizing assembly that can be installed on top of an exterior conveyor belt.

Turning now to the next figure, FIG. 2B illustrates a close-up view of the outside view of one embodiment of the sanitizing assembly 100 that can be installed on top of an exterior conveyor belt in accordance with exemplary embodiments of the present invention.

Generally, the conveyor enclosure 201 stores some of the internal components of the sanitizing assembly 100, which may include the needed components to operate and set motion the conveyor module 140. In one exemplary embodiment of the invention, the conveyor enclosure 201 may house the components of the conveyor drive mechanism 141 that include, but not limited to, the conveyor belt 143, conveyor rollers 301, conveyor pulley wheels 307, torque transfer wheels 306, and other components for operating the conveyor module. In one exemplary embodiment of the invention, the conveyor enclosure may also store the conveyor support module 142 that includes, but is not limited to, a conveyor support subassembly 302, pulley pressure blocks 305, pulley support channel 304, compression springs 308, and possibly a conveyor exit apron 303. The conveyor enclosure 201 may also include other components that are generic but essential for the support and functioning of the apparatus. The conveyor enclosure 201 may also store a plurality of lamps of the sanitizing module 130 in between the top surface and bottom surface of the conveyor belt 143. In one exemplary embodiment of the invention, the conveyor enclosure may store at least parts of a sealing module also.

Generally, the conveyor enclosure 201 may be designed to have a shape or be built of a material that prevents light generated by the sanitizing module 130 from escaping the inside of the enclosure 120. In an exemplary embodiment of the invention, the shape or material of the enclosure 120 may also reduce the fluid flow or electromagnetic radiation flow from the inside and outside of the enclosure. In one exemplary embodiment of the invention, the conveyor enclosure 201 may have a rectangular shape, a trapezoid shape, or curved shape. The edges and boundaries of the conveyor enclosure 201 may be smooth or sharp. In one exemplary embodiment of the invention, the material that makes up the conveyor enclosure 201 may be made out of a metallic material, such as steel or aluminum. In another exemplary embodiment of the invention, the material that makes up the conveyor enclosure 201 may be made out of polymer, such as plastic or rubber, or a composite material.

An enclosure 120 may be attached on top of the conveyor enclosure, which at least covers part of the top surface of the conveyor enclosure 201. The enclosure 120 is another form of enclosure 110 that creates an internal chamber for objects to enter and be sanitized by the sanitization light sources 130. In one exemplary embodiment of the invention, the enclosure 120 and the conveyor enclosure 201 may be one piece. In another exemplary embodiment of the invention, the enclosure 120 and the conveyor enclosure 201 may be at least two pieces and capable of being fastened and detached from each other. In one exemplary embodiment of the invention, the enclosure 120 and the conveyor enclosure 201 may have a latch and clasp mechanism 403 where a latch catch 408 is installed on one part and an enclosure clasp 404 is installed on the other compartment to allow the two sections to fasten and detach from one another. The enclosure 120 may prevent the light produced by the sanitizing module 130 from escaping to the exterior environment. In one exemplary embodiment of the invention, the enclosure 120 may also reduce the fluid flow or electromagnetic radiation flow between the interior of the enclosure and the exterior environment. The enclosure 120 may also cover at least part of the conveyor module 140 and conveyor belt 143. In one exemplary embodiment of the invention, the enclosure 120 may cover the whole conveyor module 140 and conveyor belt 143.

Generally, the enclosure 120 may have any shape that has sufficient volume to allow objects needed to be sanitized to enter and exit the inside of the enclosure 120 and be sanitized. In an exemplary embodiment of the invention, the enclosure 120 may have a rectangular shape, trapezoid shape, or curve shape. Generally, any material can be used to make up the enclosure 120 that prevents the light generated inside from escaping. The enclosure may be made out of the same material as the conveyor enclosure 201. In an exemplary embodiment of the invention, the material that comprises the enclosure 120 may be made out of a metallic material, such as aluminum or steel. In another embodiment of the invention, the material comprising the enclosure 120 may be made out of a polymer material or a composite material.

FIG. 2B also shows the conveyor belt 143 extending from the exterior of the enclosure 120 to the interior of the enclosure 120. The conveyor belt may be operated by a plurality of conveyor rollers 301. In one exemplary embodiment of the invention, the conveyor belt 143 may be driven by a conveyor module that uses the motion of an exterior conveyor belt to produce the torque necessary to rotate the plurality of the conveyor rollers 301 and move the conveyor belt 143. In another exemplary embodiment of the invention, some of the conveyor rollers 301 operating the conveyor belt 143 may be motorized and move the conveyor belt 143 independent from an exterior conveyor belt.

The conveyor belt 143 may be flat belt or cleated. The flat belt embodiment of the conveyor belt 143 may have a smooth horizontal surface throughout the length of the conveyor belt 143. The cleated embodiment of the conveyor belt 143 may have vertical cleats that extend from the surface of the conveyor belt 143 to compartmentalize the sections of the conveyor belt 143. The conveyor belt 143 may also comprise of a single piece or be modular. The modular embodiment of the conveyor belt 143 may comprise of multiple or numerous pieces that are hinged or interlocked together. The conveyor belt 143 may also withstand the emission of electromagnetic radiation and heat created from the sanitizing module 130 and have some of the characteristics of a sanitary or washdown conveyor belt.

The conveyor belt 143 may also be made out of transparent or semi-transparent material to allow the light produced by the sanitizing light sources between conveyor belt 131 to reach the objects placed on the conveyor belt 143. In one exemplary embodiment of the invention, the transparent or semi-transparent material of the conveyor belt may be a single piece with see-through characteristics. In another embodiment, the conveyor belt 143 may be modular with numerous interlocked pieces that have spacing between them. As a result, the light generated from the sanitizing light sources between conveyor belt 131 may traverse through the gaps and reach the bottom surface of the object.

The opening inlet and the exit outlet of the enclosure 120 may have light containment shroud such as curtains 202 that serve as movable barriers between the inside and outside of the enclosure 120. The light containment curtains 202 may function to allow objects to enter and exit the enclosure 120 and limit the amount of light produced by the sanitizing module 130 from escaping the inside of the enclosure 120. In one exemplary embodiment of the invention, the light containment curtains 202 may also reduce the fluid flow or electromagnetic radiation flow between the interior of the enclosure 120 and the exterior environment. The light containment curtains 202 may extend from the top of the enclosure 120 to the top surface of the conveyor belt 143. Generally, the light containment curtains 202 may have any shape that blocks light from entering and exiting the inside of the apparatus. In one exemplary embodiment of the invention, the light containment curtains 202 may be comprised of numerous rectangular strips with no gaps between them. Generally, the material that make up the light containment curtains 202 may be made out of any material that prevents light from entering and exiting the inside of the apparatus. In one exemplary embodiment of the invention, the light containment curtains 202 may comprise of elastic polymer material, such as plastic or rubber.

Figure 2C:
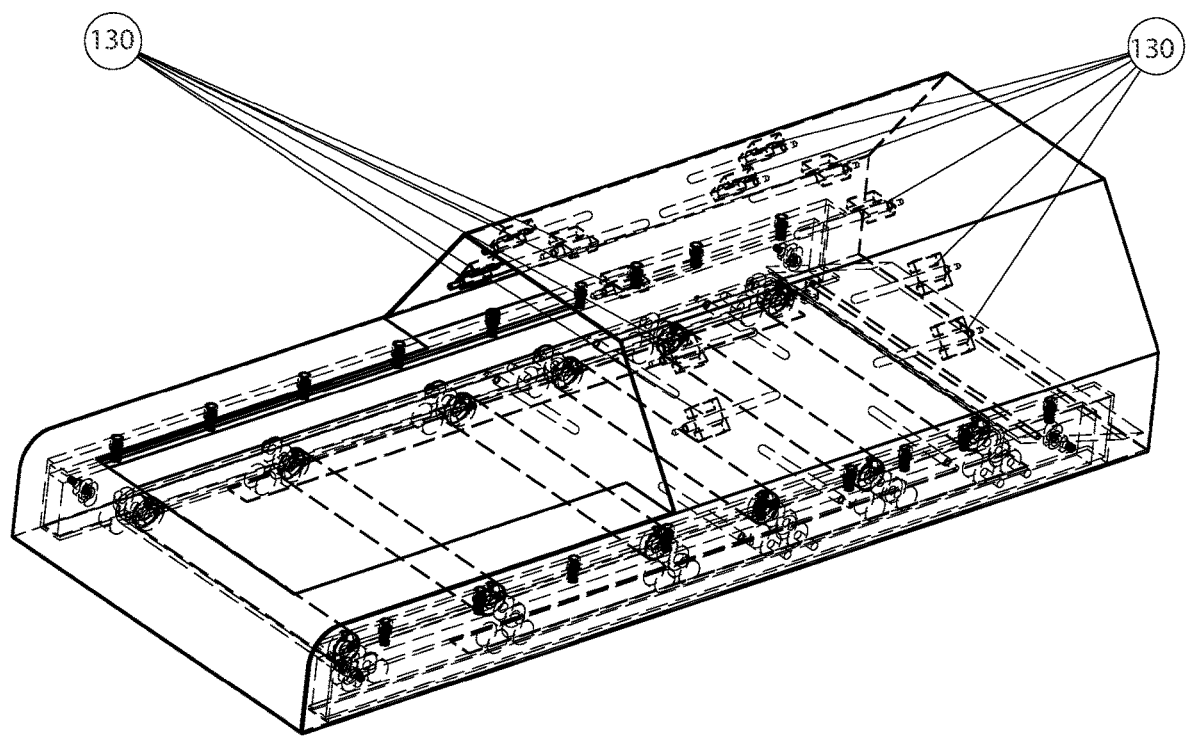
FIG. 2C illustrates a transparent view through the exterior walls of one embodiment of the sanitizing assembly.

Turning now to the next figure, FIG. 2C illustrates a transparent view through the exterior walls of one embodiment of the sanitizing assembly in accordance with exemplary embodiments of the present invention. From this view, it can be seen that a plurality of sanitizing module 130 can be installed inside the side surfaces and ceilings of the enclosure, or enclosure, and between the top surface and bottom surface of the transparent or semi-transparent conveyor belt that occupy the inside of the enclosure. The purpose of the sanitizing module 130 is to sanitize the objects that get exposed to the electromagnetic light. In one exemplary embodiment, the sanitizing module 130 may comprise of a light bulb, circuitry, wiring, and a mount.

Generally, the sanitizing module 130 may include conventional bulbs, filaments, LEDs, mercury-vapor lamps, excimer lamps, or other types of radiant energy producing sources suitable for emitting energy that is sanitizing. The sanitizing module 130 may produce light in any wavelength designed to sanitize the objects. In one exemplary embodiment of the invention, the sanitizing module 130 emit ultraviolet lights between the 100 to 400 nanometer wavelength range. In one exemplary embodiment of the invention, the sanitizing module 130 may emit light between the 100 to 300 nanometer wavelength range or the wavelength of a generic germicidal UV light source. In another exemplary embodiment of the invention, the sanitizing light source 130 may emit light at the UVC wavelength range, which may coincide with the previous exemplary embodiment light emissions disclosed herein. Generally, the fluence rate or UV dose rate is in a sufficient range to substantially sanitize the objects being transferred through the conveyor belt. In some exemplary embodiments, sanitizing module 130 is compatible with a wide range of radiant energy wavelengths so that the sanitizing module 130 may be customized to meet the users' sanitizing needs depending on the target bacterial and or virological environments undergoing treatment. To these ends, for example and without limiting the scope of the present invention, sanitizing module 130 may be adapted to incorporate different radiant emitting sources, such as different LED lights wherein each LED light corresponds to a different wavelength or wavelength range.

The sanitizing light sources between conveyor belt 131, sanitizing light sources attached inside of enclosure 132, and sanitizing light sources attached inside of bottom shell 401 may have the same specifications as described for the sanitizing module 130.

The different components of the embodiment's conveyor module 140 can also be seen. Particularly, the conveyor belt transports the objects through the sanitization process by the circular motion of a plurality of conveyor rollers 301, conveyor pulley wheels 307, and torque transfer wheels 306, which translate the motion of an exterior conveyor belt to the conveyor belt 143 of the sanitizing assembly 100.

Figure 3A:
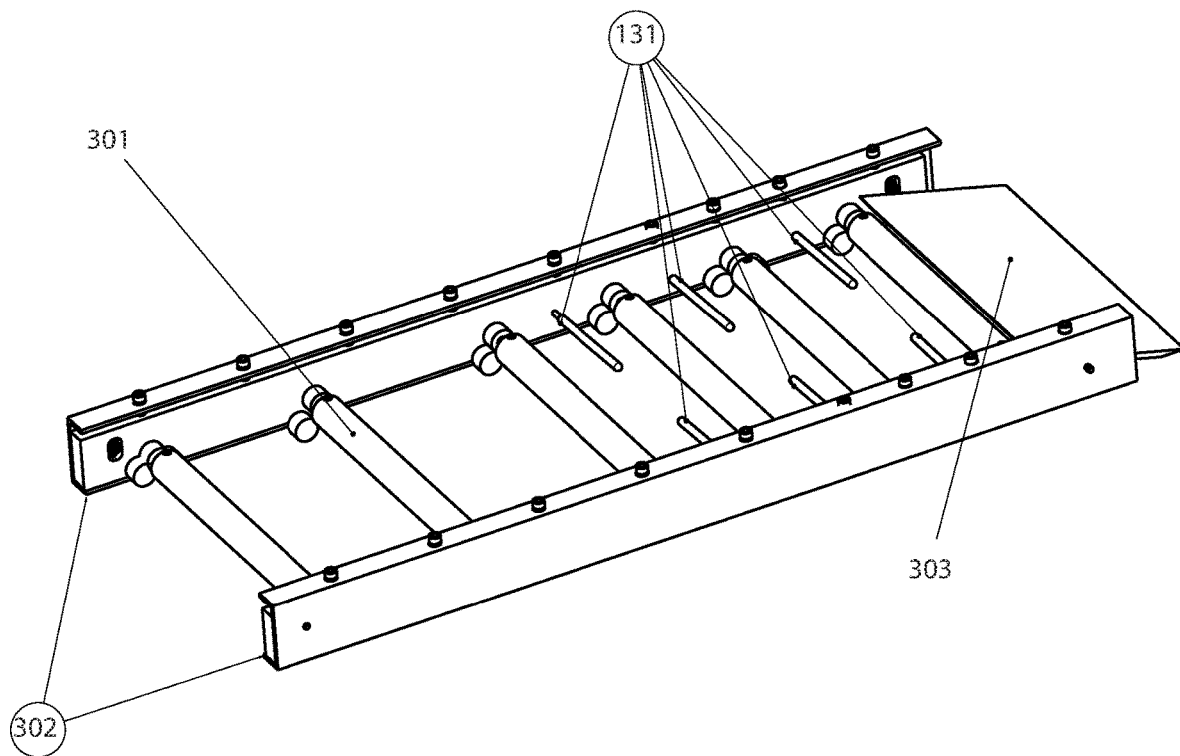
FIG. 3A illustrates the internal components of the conveyor subassembly mechanism with the conveyor belt removed.

Turning now to the next figure, FIG. 3A illustrates the internal components of the conveyor subassembly mechanism with the conveyor belt 143 removed in accordance with exemplary embodiments of the present invention. From this view, the sanitizing light sources between conveyor belt 131 may be seen here. The sanitizing light sources between conveyor belt 131 may be between the top surface of the conveyor belt and the bottom surface of the conveyor belt and attached to the pulley pressure blocks 305. In one exemplary embodiment of the invention, the sanitizing light sources between conveyor belt 131 may be only placed within the inside of the enclosure.

The sanitizing light sources between conveyor belt 131 have the same specifications as described previously. In one exemplary embodiment of the invention, the sanitizing light sources between conveyor belt 131 may comprise of a light source, circuitry, wiring, and mount for the light source to be fixed between the upper and lower sections of the conveyor belt. In one exemplary embodiment of the invention, the sanitizing light sources between conveyor belt 131 may emit electromagnetic light in the 100 to 400 nanometers wavelength range. In another embodiment of the invention, the sanitizing light sources between conveyor belt 131 may emit electromagnetic light between the 100 to 300 nanometer wavelength range or the wavelength of a generic germicidal UV light source. The purpose of the sanitizing light sources between conveyor belt 131 is to sanitize the objects from below by emitting through the transparent or semi-transparent conveyor belt. In some exemplary embodiments, sanitizing module 130 is compatible with a wide range of radiant energy wavelengths so that the sanitizing module 130 may be customized to meet the users' sanitizing needs depending on the target bacterial and or virological environments undergoing treatment. To these ends, for example and without limiting the scope of the present invention, sanitizing module 130 may be adapted to incorporate different radiant emitting sources, such as different LED lights wherein each LED light corresponds to a different wavelength or wavelength range.

The conveyor rollers 301 are also shown in this figure where they function to rotate and set the conveyor belt 143 in motion. The conveyor rollers 301 may be cylindrical shaped and orientated horizontally where the terminal edges have shafts that are attached to the pulley pressure blocks 305. The conveyor rollers 301 are rotatable about their longitudinal axis and can move in circular motion to drive the conveyor belt 143 in linear motion. The conveyor roller's 301 shafts extend out to connect to the conveyor pulley pressure blocks 305. Between the shaft's region that connects with the pulley pressure blocks 305 and the terminal cylindrical edge of the roller, there may be a conveyor pulley wheel 307 that is attached to the shaft at the center region of the conveyor pulley wheel 307.

The conveyor pulley wheels 307 may receive torque from the torque transfer wheels 306 to set the conveyor rollers 301 in rotational motion. The torque transfer wheels 306 may be placed below the conveyor pulley wheels so the upper arc lengths of the torque transfer wheels 306 contacts the lower arc lengths of the conveyor pulley wheels 307. The lower arc lengths of the torque transfer wheels 306 contact the exterior conveyor belt. As the exterior conveyor belt sets in motion, the linear motion of the exterior conveyor belt rotates the torque transfer wheels 306. Such rotational motion translates to the conveyor pulley wheels 307 and the conveyor rollers 301, which causes the conveyor belt 143 to move and transport the objects through the apparatus. In one exemplary embodiment, some of the conveyor rollers 301 may be motorized or be attached to a motorized drive to provide additional torque in order to move the conveyor belt 143. Two additional actuators could also increase the downward force on the torque transfer pulley wheels in contact with the store conveyor belt, if necessary. These could also be connected to load cells to measure the force.

Generally, the conveyor rollers 301 may be made out of any material. In one exemplary embodiment of the invention, at least the outer surface of the conveyor rollers 301 may be made out of a metallic material, such as steel or aluminum. In another exemplary embodiment of the invention, at least the outer surface of the conveyor rollers 301 may be made out of polymer material, such as plastic or rubber, or composite material.

FIG. 3A also illustrates the conveyor exit apron 303 that is attached to the pulley pressure blocks 305 at the end of the apparatus near the exit of the enclosure 110 or enclosure 120. The conveyor exit apron 303 may be a downward inclined ramp that the sanitized objects may slide to the outside of the apparatus. In an exemplary embodiment of the invention, the incline of the conveyor exit apron 303 may be adjusted. Generally, the surface of the conveyor exit apron 303 can be of any shape that allows for the sanitized objects to slide out of the enclosure 120. In an exemplary embodiment of the invention, the surface of the conveyor exit apron 303 may be rectangular shaped. Generally, any material can make up the conveyor exit apron 303. The material may have a smooth surface that has a low friction coefficient. In one exemplary embodiment, the material making up the conveyor exit apron 303 may be metallic, such as aluminum or steel. In another exemplary embodiment, the material may be polymer or composite material.

The conveyor support subassembly 302 is also shown in the figure, which may have a left and right portion and be housed in the conveyor enclosure 201. Generally, the conveyor support subassembly 302 runs along the length of the sanitizing assembly 100, and the left and right portion are placed at the width of the invention. The conveyor support subassembly 302 may support the conveyor module 140 and house the pulley pressure blocks 305.

In one exemplary embodiment of the invention, the compression springs 308 may be screwed on the top surface of the conveyor support subassembly 302 and create a gap between the top surface of the pulley pressure block 305 and the interior top surface of the conveyor support subassembly 302 where the spring of the compression springs 308 can stretch and retract. The compression springs 308 adjust the pulley pressure block's 305 height within the conveyor support subassembly 302 depending on the weight placed on the conveyor belt 143. Moreover, when a securing mechanism, for example a latch 304a is employed, which couples the assembly to an existing structure of the retail conveyor belt enclosure, the springs 308 enable adjustment of a desired pressure or force sandwiching the assembly with the retail conveyor in order to produce a desired contact and traction between the retail conveyor belt and the transfer and pulley wheels 306 and 307.

Generally, the conveyor support subassembly 302 may be any shape that would support of the conveyor module and allow the pulley pressure blocks 305 to fit inside the subassembly. In one exemplary embodiment of the invention, the conveyor support subassembly 302 may be two C-shaped beams at the width of the apparatus where their openings face the interior of the conveyor module 140 and allow for the pulley pressure blocks 305 to fit inside the gap.

Generally, the conveyor support subassembly 302 may be made out of any material that provides sturdy support to the apparatus. In an exemplary embodiment of the invention, the conveyor support subassembly 302 may be made up of a metallic material, such as aluminum or steel. In another exemplary embodiment of the invention, the conveyor support subassembly 302 may be made up of polymer or composite material.

Turning now to the next figure, FIG. 3B illustrates the longitudinal cross-sectional view of a conveyor module 140 in accordance with exemplary embodiments of the present invention. The tension on the compression strings is adjusted on installation to create sufficient force to ensure the torque transfer from the store conveyor belt to the conveyor. In some exemplary embodiments, the tension may be controlled by way of mechanical components such as screws and springs. In some exemplary embodiments, the tension may be controlled by way of actuators with sensors adapted to adjust depending on a condition of an existing conveyor system, in order to eliminate a need to continuously adjust the assembly.

The pulley pressure block 305 fits within the conveyor support subassembly 302 and extends along the length of the apparatus. The pulley pressure blocks 305 can be beams that support the apparatus, particularly the conveyor module 140. In one exemplary embodiment of the invention, the conveyor support subassembly 302 is C-shaped, and the pulley pressure block 305 is rectangular shaped that fits inside the opening of the C-shape. The conveyor rollers 301, the conveyor pulley wheels 307, and the torque transfer wheels 306 can be attached to the pulley pressure blocks 305 to rotate and create the torque needed to set the conveyor belt 143 in motion. The conveyor rollers 301 are horizontally attached to the pulley pressure blocks 305. In an exemplary embodiment of the invention, the pulley pressure blocks 305 may have regions and spaces that allow the conveyor rollers' 301 shafts, which also have the conveyor pulley wheels 307 attached to it, to link with the pulley pressure blocks 305 and rotate about their circular cross-sectional center point. The pulley pressure blocks 305 may also have regions and spaces that allows the torque transfer wheels 306 to link and rotate about their circular cross-sectional center point. A view of how the rotational mechanism works is shown in FIG. 3B.

The sanitizing light sources between conveyor belt 131 may also be attached to the pulley pressure blocks 305 in the portion that is enclosed by the enclosure 120, or enclosure 110. Generally, the pulley pressure blocks 305 may be any shape that allow for the support of the conveyor module 140. In an exemplary embodiment of the invention, the pulley pressure blocks 305 may be rectangular beams housed inside the conveyor support subassembly 302 and extending along the length of the invention. Without limiting the scope of the invention, the beams may or may not be hollow inside.

Generally, the pulley pressure blocks 305 may be made out of any material suitable for supporting the apparatus and the conveyor module 140. In an exemplary embodiment, the pulley pressure blocks 305 may be made out of a metallic material, such as aluminum or steel. In another exemplary embodiment, the pulley pressure blocks 305 may be made out of polymer material or composite material.

From this view, the conveyor pulley wheels 305, which are connected to the conveyor rollers 301, may be placed in between the upper surface and bottom surface of the conveyor belt 143 and above the torque transfer wheels 306. From this position, the conveyor pulley wheels 305 contact the torque transfer wheels 306 and receives the torque needed to move the conveyor belt 143. The circular motion of the conveyor pulley wheels 305 rotates the conveyor rollers 301 and, as a result, sets in motion the conveyor belt 143. Such movement occurs because at lower arc lengths of the conveyor pulley wheels 307 contacts the upper arc lengths of torque transfer wheels 306. The torque transfer wheels 306 rotate and translate torque to the conveyor pulley wheels 307 because the lower arc lengths of the torque transfer wheels contacts the exterior conveyor belt. As a result, the linear motion of exterior conveyor belt provides a torque and sets the torque transfer wheels 306 in circular motion, as seen in FIG. 3B. In an exemplary embodiment of the invention, the conveyor pulley wheels 307 may have wheel treads or tracks to create more traction between its surface and the torque transfer wheels 306.

Generally, the conveyor pulley wheels 307 may be any shape that can receive the torque from torque transfer wheels 306 and transfer that torque to the conveyor rollers 301 and the conveyor belt 143. In an exemplary embodiment of the invention, the conveyor pulley wheels 307 may have a cylindrical shape or a wheel shape. The conveyor pulley wheels 307 may also have curved edges and boundaries. Generally, the conveyor pulley wheels 307 may be made of any material that allows for the receiving of torque from the torque transfer wheels 306 and the transferring of the torque to the rollers. In an exemplary embodiment of the invention, the conveyor pulley wheels 307 may be made out of a metallic material, such as steel or aluminum. In another exemplary embodiment of the invention, the conveyor pulley wheels 307 may be made out of polymer material or composite material.

The torque transfer wheels 306 are also shown to be attached to the pulley pressure blocks 305 and contacting the exterior conveyor belt and the conveyor pulley wheels 307. The torque transfer wheels 306 are capable of rotating about their center points and create torque from the motion of the exterior conveyor belt and translate the torque to the conveyor pulley wheels 307 and the conveyor rollers 301 to ultimately move the conveyor belt 143. The torque transfer wheels 306 may be placed below the conveyor pulley wheels 307 and above the exterior conveyor belt. At upper arc lengths of the torque transfer wheels 306 contacts the lower arc lengths of conveyor pulley wheels 307. Also the lower arc lengths of the torque transfer wheels 306 contact the exterior conveyor belt. In an exemplary embodiment of the invention, the torque transfer wheels 306 may have wheel treads or tracks to create better traction between the surfaces of the external conveyor belt and also the conveyor pulley wheel 307.

Generally, the torque transfer wheels 306 may be any shape that allows the receiving of torque from the exterior conveyor belt and transfer that torque to the conveyor pulley wheels 307. In an exemplary embodiment of the invention, the torque transfer wheels 306 may have a cylindrical shape or wheel shape. The torque transfer wheels 306 may also have curved edges and boundaries. Generally, torque transfer wheels 306 may be made out of any material that allows for the receiving of torque from an external conveyor belt and transferring that torque to the conveyor pulley wheels 307. In an exemplary embodiment of the invention, the torque transfer wheels 307 may be made out of a metallic material, such as steel or aluminum. In another exemplary embodiment of the invention, the torque transfer wheels 306 may be made out a of polymer material or a composite material.

The conveyor exit apron 303 may also be attached to the pulley pressure block 305 at the exit outlet of the enclosure 120 or enclosure 110. The conveyor exit apron's 303 height on the pulley pressure block 305 may be adjusted to change the steepness of the component.

Figure 3C:
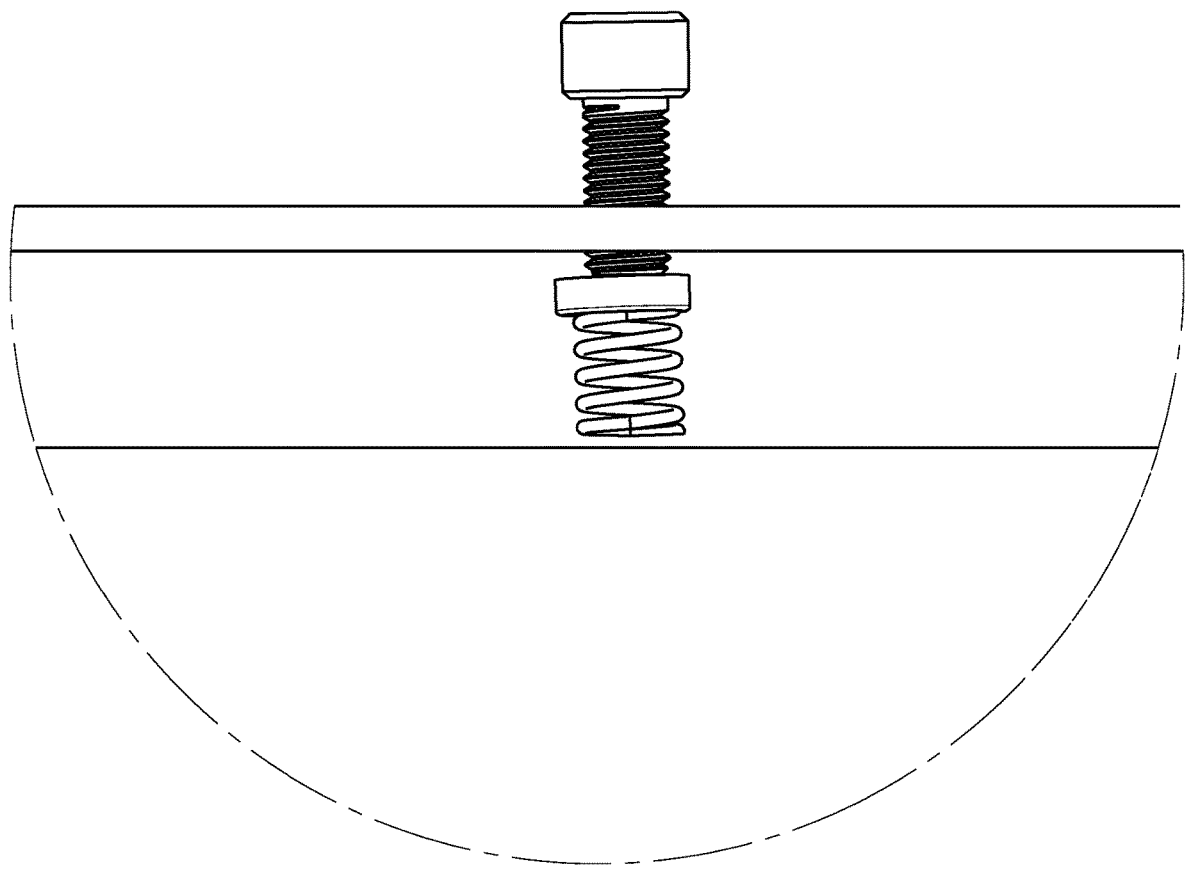
FIG. 3C-FIG. 3D illustrate close-up views of a conveyor drive mechanism in one embodiment of the invention.

The compression springs 308 can also be seen in FIG. 3C. As mentioned above, when a securing mechanism, for example a latch 304a is employed, the springs 308 enable adjustment of a desired pressure or force sandwiching the assembly with the retail conveyor in order to produce a desired contact and traction between the retail conveyor belt and the transfer and pulley wheels 306 and 307.

Figure 3D:
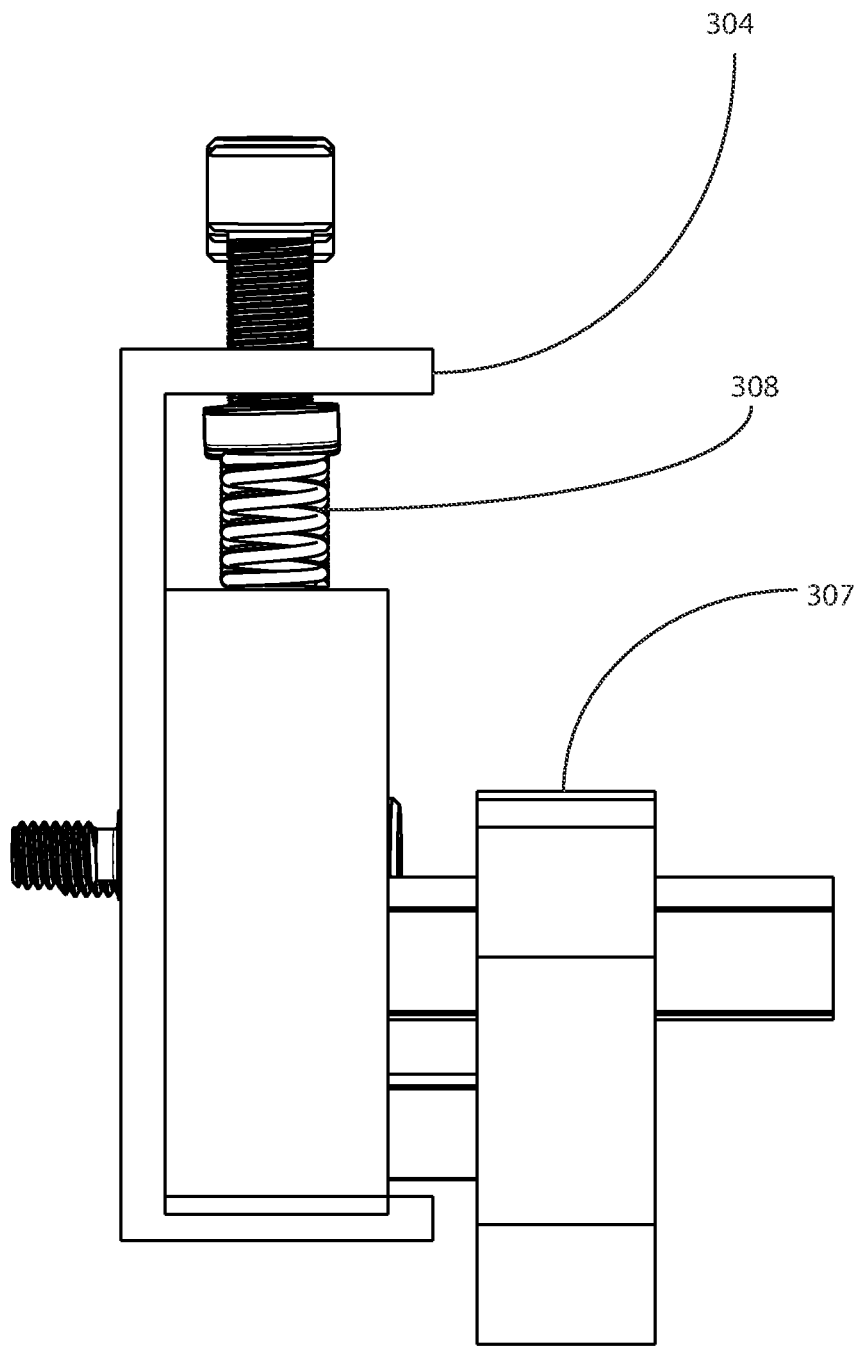

Turning now to the next figures, FIG. 3C-3D illustrate a close-up view of some parts of the conveyor drive mechanism 141 in accordance with exemplary embodiments of the present invention. Generally, the conveyor drive mechanism 141 may be compartmentalized to a set of components that have the same orientation and are repeated throughout the conveyor module 140. In one exemplary embodiment, two torque transfer wheels 306 are below and contacting a conveyor pulley wheel 307, one on its left side and the other on the right side. The lower arc length of the conveyor pulley wheel 307 may be contacting the upper arc lengths of the torque transfer wheels 306. The lower arc lengths of the torque transfer wheels 306 contact the exterior conveyor belt. As the exterior conveyor belt moves forward or backwards linearly, such motion makes the torque transfer wheels 306 move in circular motion due to the frictional force between the surfaces. The circular motion of the torque transfer wheels 306 makes the conveyor pulley wheel 307 move in circular motion due to the frictional forces between the surfaces. The conveyor pulley wheel 307 then rotates the conveyor roller 301 since the two components share the same rotational shaft. As the conveyor roller 301 rotates, the conveyor belt 143 sets in motion since the conveyor roller 301 is connected in between the bottom and top surface of the conveyor belt 143 and provides a frictional push or pull force. This mechanism and orientation repeats along the conveyor module 140 to cover the full range of the conveyor belt 143.

Figure 4A:
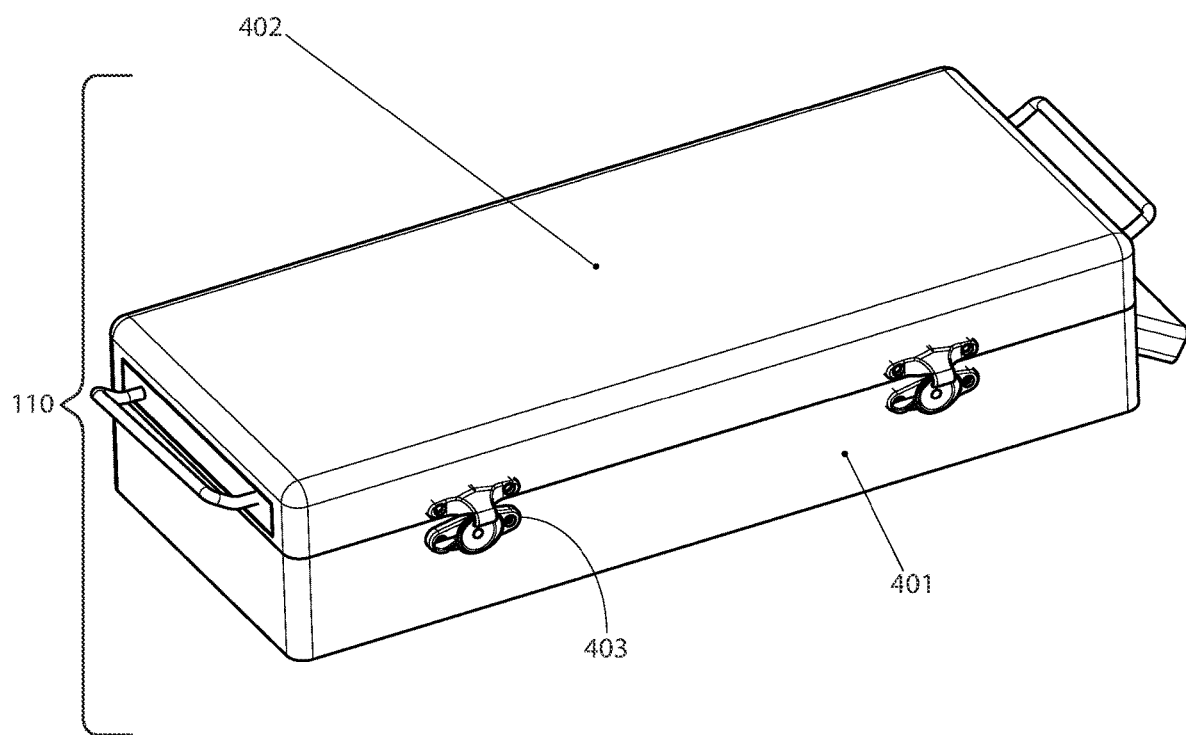
FIG. 4A illustrates the outside view of one embodiment of the sanitizing assembly where the conveyor module is sheltered inside the apparatus along with the rest of the invention's internal components.

Turning now to the next figure, FIG. 4A illustrates the outside view of one embodiment of the sanitizing assembly 100 where the conveyor module 140 is housed inside an enclosure along with the rest of the assembly's internal components in accordance with exemplary embodiments of the present invention. In this exemplary embodiment of the invention, it may be appreciated that the invention may not need to be attached to an exterior conveyor belt and may function independently. Generally, the enclosure 110 may store the conveyor module 140, the sanitization light sanitizing module 130, and the sealing module 150 and have sufficient volume to allow objects needed to be sanitized to be placed inside. The enclosure 110 may function to block the light produced by the sanitizing light sources from exiting the inside of the apparatus. In one exemplary embodiment, the enclosure 110 may also reduce the fluid flow or electromagnetic radiation flow between the interior of the enclosure 110 and the exterior environment.

In one exemplary embodiment of the invention, the enclosure 110 may comprise of a top shell 402 and a bottom shell 401 that can be fastened and detached from each another, and in exemplary embodiments, may be swivably coupled together much like a briefcase. The top shell 402 may store the upper parts of the conveyor module 140, the sanitizing module 130, and the sealing module 150. The bottom shell 401 may store the lower parts of the conveyor module 140, the sanitizing module 130, and the sealing module 150. A sufficiently large enough gap may exist inside the enclosure between the bottom shell and the top shell so that objects can travel through the enclosure when both the top and bottom shells are coupled together in a closed position. The bottom shell 401 and the top shell 402 may have a latch and clasp mechanism 403 where a latch catch 408 may be installed on either the upper or bottom shell and an enclosure clasp 404 may be attached on the other enclosure assembly to allow the two sections to fasten and detach from each other. Generally, any type of latch and clasp mechanism 403 designed for fastening and detaching two-part storage objects may be used.

The interior and exterior of the enclosure 110 may also be connected by an entry inlet and an exit outlet placed on the opposite longitudinal ends of the enclosure. In one exemplary embodiment of the invention, the entry inlet may have an entry drawer 405 that acts as a hatch and opens and closes. The entry drawer 405 may comprise of a handle for the opening and closing of the entry. In one exemplary embodiment of the invention, the exit outlet may have a conveyor exit apron 303 that may be a downward inclined ramp where the sanitized items can slide and exit the interior of the enclosure 110. In another exemplary embodiment, the exit outlet may contain a box or a basket that acts as an instrument catch bin 406 where the sanitized and sealed objects may fall inside.

Generally, the enclosure 110 may be designed to have a shape or be built of a material that prevents light generated by the sanitizing module 130 from escaping the inside of the enclosure. In an exemplary embodiment of the invention, the shape or material of the enclosure 110 may also reduce the fluid flow or electromagnetic radiation flow from the inside and outside of the enclosure 110. In one exemplary embodiment of the invention, the enclosure 110 may have a rectangular shape, a trapezoid shape, or cuboid shape. The edges and boundaries of the enclosure 110 may be smooth or sharp. In one exemplary embodiment, the material that makes up the enclosure 110 may be made out of a metallic material, such as steel or aluminum. In another exemplary embodiment, the material that makes up the enclosure 110 may be made out of polymer, such as plastic or rubber, or a composite material.

Figure 4B:
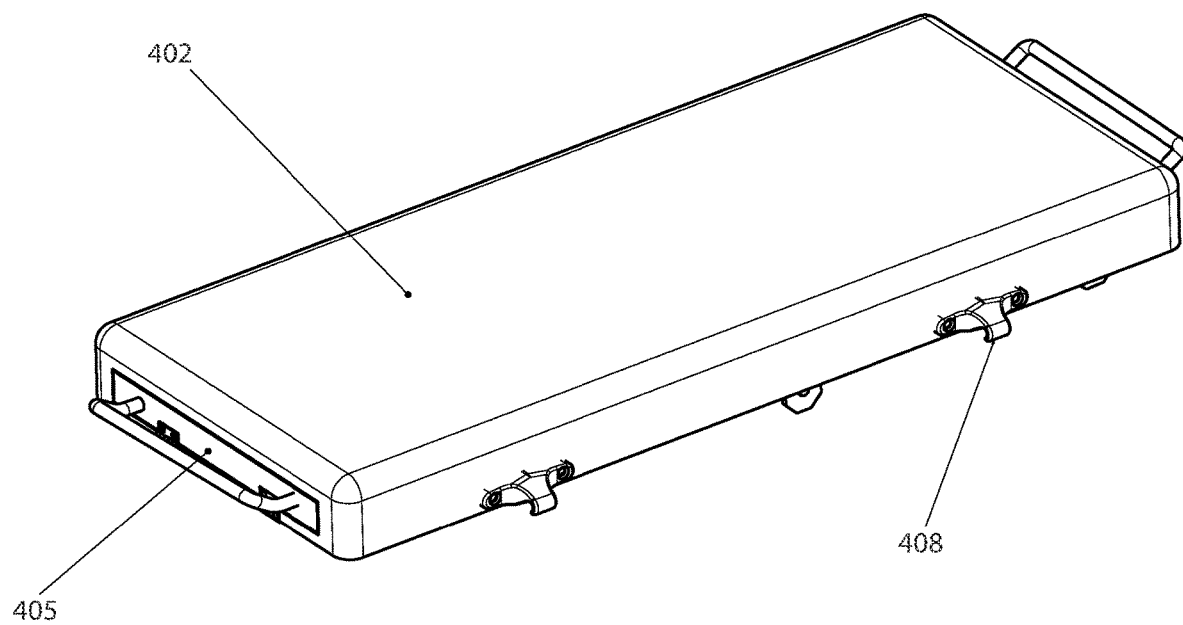
FIG. 4B illustrates a close-up view of the outside view of the top shell of one embodiment of the sanitizing assembly.

Turning now to the next figure, FIG. 4B illustrates a close-up view of the outside view of the top shell 402 of one embodiment of the sanitizing assembly in accordance with exemplary embodiments of the present invention. In this embodiment of the invention, the sanitizing assembly 100 may not need and can work independently from an exterior conveyor belt (i.e., without requiring an interface such as interface 110a). The top shell 402 may be attached to the bottom shell 401 to create the assembly gap where objects can be sanitized and possibly covered and sealed.

The top shell 402 may have sufficient volume to store the inner components of the invention and allow objects needed to be sanitized to fit inside and travel through the enclosure 110. Generally, the top shell 402 may be designed to have a shape or be built of a material that prevents light generated by the sanitizing module 130 from escaping the inside of the enclosure 110. In an exemplary embodiment of the invention, the shape or material of the top shell 402 may also reduce the fluid flow or electromagnetic radiation flow from the inside and outside of the enclosure 110. In one exemplary embodiment of the invention, the top shell 402 may have a rectangular shape, a trapezoid shape, or curve shape. The edges and boundaries of the top shell 402 may be smooth or sharp. In one exemplary embodiment of the invention, the material that makes up the top shell 402 may be made out of a metallic material, such as steel or aluminum. In another exemplary embodiment, the material that makes up the top shell 402 may be made out of polymer or a composite material.

The top shell 402 may have an entry inlet for objects needed to be sanitized to be placed inside the apparatus. In an exemplary embodiment of the invention, the entry inlet may have an entry drawer 405 that acts as a hatch and opens and closes. The entry drawer 405 may comprise of a handle for opening and closing the entry inlet. The entry drawer 405 may prevent light from entering or exiting the apparatus. In an exemplary embodiment, the entry drawer 405 may reduce the fluid flow or electromagnetic radiation flow from the inside and outside of the apparatus. In another exemplary embodiment, the top shell 402 may also have an exit outlet corresponding to the entry inlet. In the shown embodiment, while the top shell 402 includes an inlet of the enclosure 110 (i.e., the top shell 402 coupled to bottom shell 401), the top shell 402 does not include an outlet and the outlet of enclosure 110 is present only on the bottom shell 401. Of course, a person of ordinary skill in the art may appreciate that other inlet-outlet configurations are possible, but this configuration facilitates an object moving from the inlet to the outlet in a manner that does not have to overcome gravity and thus avoid unnecessary mechanical strain or unnecessary energy consumption.

The top shell 402 may also have a fastening component such as a latch catch 408 or an enclosure clasp 404 near the lower edge of the top shell where the edge connects with bottom shell. The latch and clasp mechanism 403 help in fastening and detaching the top shell 402 with the bottom shell 401. Generally, any type of latch and clasp mechanism 403 designed for fastening and detaching two-part storage objects may be used.

Figure 4C:
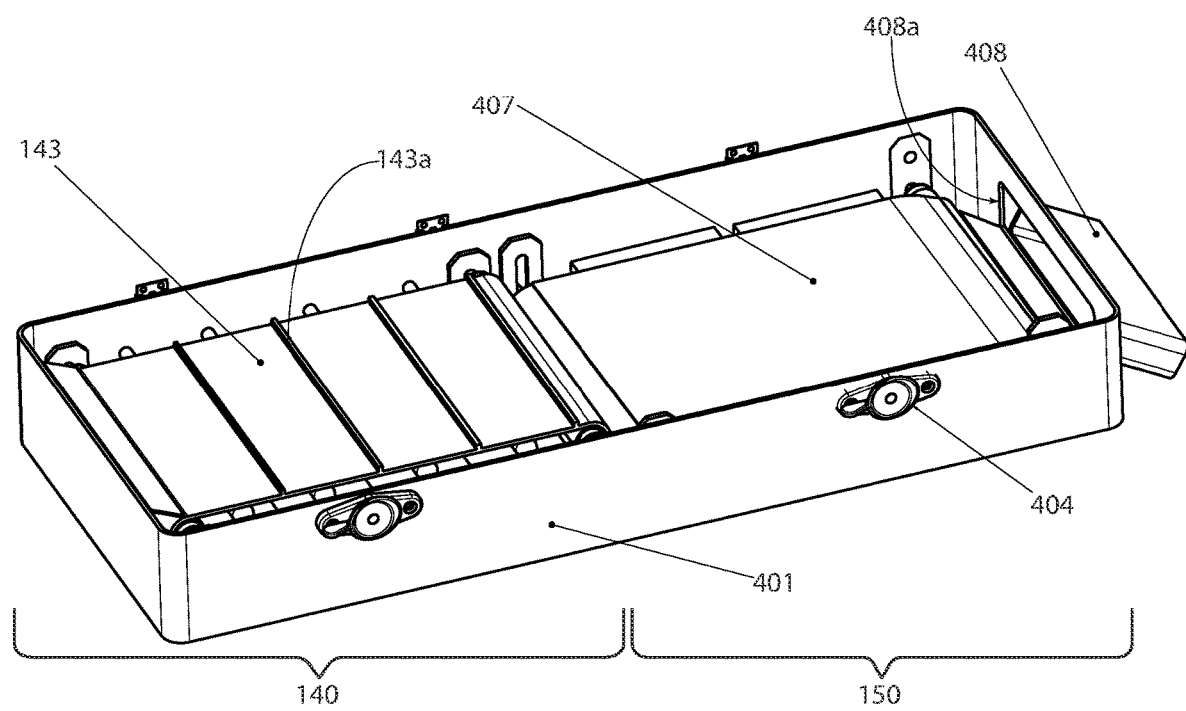
FIG. 4C illustrates a close-up view of the bottom shell of one embodiment of the sanitizing assembly where the inside components are shown.

Turning now to the next figure, FIG. 4C illustrates a close-up view of the bottom shell 401 of one embodiment of the sanitizing assembly where the inside components are shown in accordance with exemplary embodiments of the present invention. In this embodiment of the invention, the sanitizing assembly 100 includes a sealing module 150. Generally, the objects needed to be sanitized undergo the sanitization process first and get sealed subsequently via passing through the sealing module 150.

The bottom shell 401 may have sufficient volume to store the inner components of the invention and allow objects needed to be sanitized to fit inside and travel through the enclosure 110. Generally, the bottom shell 401 may be designed to have a shape or be built of a material that prevents light generated by the sanitizing module 130 from escaping the inside of the enclosure 110. In an exemplary embodiment of the invention, the shape or material of the bottom shell 401 may also reduce the fluid flow or electromagnetic radiation flow from the inside and outside of the enclosure 110. In one exemplary embodiment of the invention, the bottom shell 401 may have a rectangular shape, a trapezoid shape, or curve shape. The edges and boundaries of the bottom shell may be smooth or sharp. In one exemplary embodiment of the invention, the material that makes up the bottom shell 401 may be made out of a metallic material, such as steel or aluminum. In another exemplary embodiment, the material that makes up the bottom shell 401 may be made out of polymer or a composite material. In another exemplary embodiment of the invention, the bottom shell 401 may be made out of the same material as the top shell 402.

The objects needed to be sanitized may travel through the assembly by the way of a conveyor module 140, which may include a conveyor belt 143. The conveyor belt 143 may be operated by a plurality of conveyor rollers. In one exemplary embodiment of the invention, the conveyor rollers may have at least one motorized conveyor roller 601 (see also FIG. 6A).

The conveyor belt 143 may be a flat belt or may be cleated. The flat belt embodiment of the conveyor belt 143 may have a smooth horizontal surface throughout the length of the conveyor belt 143. The cleated embodiment of the conveyor belt 143 may have vertical cleats 143*a* that extend from the surface of the conveyor belt 143 to compartmentalize the sections of the conveyor belt 143. The conveyor belt 143 may also comprise of a single piece or be modular. The modular embodiment of the conveyor belt 143 may comprise of multiple or numerous pieces that are hinged or interlocked together. The conveyor belt 143 may also withstand the emission of electromagnetic waves and heat created from the sanitizing light sources and have some of the characteristics of a sanitary or washdown conveyor belt.

The conveyor belt 143 may also be made out of transparent or semi-transparent material to allow the light produced by the sanitizing light sources between conveyor belt 131 to reach the objects placed on the conveyor belt 143. In one exemplary embodiment of the invention, the transparent or semi-transparent material may be a single piece with see-through characteristics. In another embodiment, the conveyor belt 143 may be modular with numerous interlocked pieces that have spacing between them. As a result, the light generated from the sanitizing light sources between conveyor belt 131 may traverse through the gaps and reach the bottom surface of the object. In yet other exemplary embodiments, the conveyor belt 143 may comprise a mesh or meshed material that allows light to pass through.

The conveyor belt 143 may be designed to receive the objects from the entry inlet and transfer them through the sanitizing module 130 to be sanitized. In one exemplary embodiment of the invention, the bottom shell 401 may have an entry inlet. In other embodiments, such as the one shown, the inlet is exclusively on the top shell, but the bottom shell includes an outlet, such as outlet 408*a*.

After the sanitization, the objects may traverse through the sealing module 150 where they can be covered, enclosed, and sealed by a sealing material 407 to preserve their cleanliness. The sanitized objects may traverse through the sealing module 150 by the way of sealer motorized rollers that comprise of upper sealer motorized roller 611 and lower sealer motorized roller 602 placed near the end of the assembly and provide pulling forces.

The sealing material roll 153 has the sealing material 407 that the sanitized objects can be covered, enclosed, and sealed. In one exemplary embodiment of the invention, the sealing material roll 153 may be a roller that has the sealing material 407 wrapped around it. In one exemplary embodiment of the invention, the sealing material roll 153 may comprise of two rollers that provide layers of the sealing material 407, which the layers may be attached to the sealer motorized rollers at the end of the sealing module. One layer, the lower sealer roll 605, may be placed under the sanitized objects. The other layer, the upper sealer roll 606, may be placed on top of the sanitized object. The two layers may then be pressed together to create an enclosure and sealing around the sanitized object. A sanitized object may traverse through the sealing module 150 since it contacts the upper sealer roll 606 and the lower sealer roll 605, which are pulled by the sealer motorized rollers at the end of the apparatus. The sealer motorized rollers may comprise of an upper sealer motorized roller 611 and a lower sealer motorized roller 602.

In one exemplary embodiment of the invention, the lower sealer roll 605 and upper sealer roll 606 may be comprised of rollers and sealing material 407 that can seal together by heat sealing. The upper seal die may also include a sponge-like platen which forces the air from the space between the upper and lower sealing material rolls to create a vacuum upon sealing. Such material may be a thermoplastic. The lower sealer roll 605 and the upper sealer roll 606 may be comprised of a material that also sever and detach when pressed by the trim die 152 of the sealing module 150. In one exemplary embodiment, the severing done by the trim die 152 does not completely detach from the rest of the roll until the sealer motorized rollers pull the sealed object to the exit outlet.

The bottom shell 401 may also have an exit outlet where the sanitized and sealed objects may exit the assembly. In one exemplary embodiment, the exit outlet may have a downward inclined ramp where the sanitized and possibly sealed objects may slide out of the assembly. In another exemplary embodiment of the invention, the exit outlet may have an instrument catch bin 406. The instrument catch bin 406 may be capable of covering the exit outlet and receiving the sanitized products. Generally, the instrument catch bin 406 may be anything big enough to catch the sanitized and sealed objects. In an exemplary embodiment of the invention, the instrument catch bin 406 may be a box or a basket where its opening faces the direction that the sanitized objects exit the assembly.

The bottom shell 401 may also have a fastening component such as a latch catch 408 or an enclosure clasp 404 near the upper edge of the bottom shell where the edge connects with the top shell. The latch and clasp mechanism 403 help in fastening and detaching the bottom shell 401 with the top shell 402. Generally, any type of latch and clasp mechanism 403 designed for fastening and detaching two-part storage objects may be used.

Figure 5A:
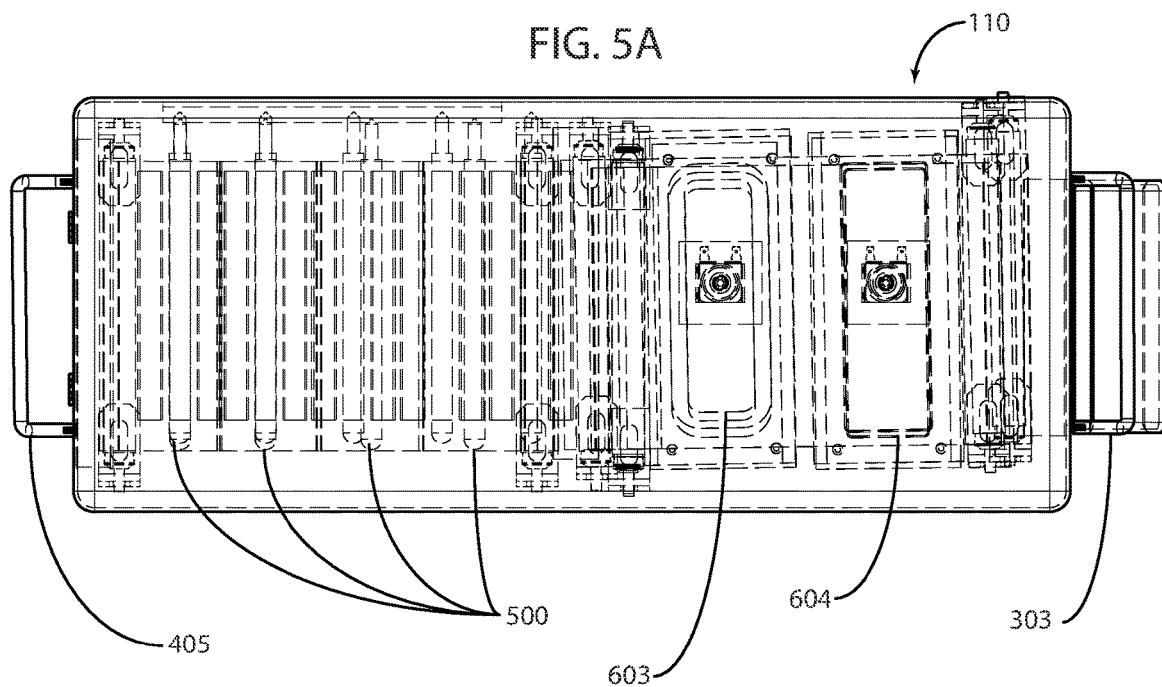
FIG. 5A-FIG. 5B illustrate transparent top and front views showing components through the exterior walls of another embodiment of the sanitizing assembly.
Figure 5B:
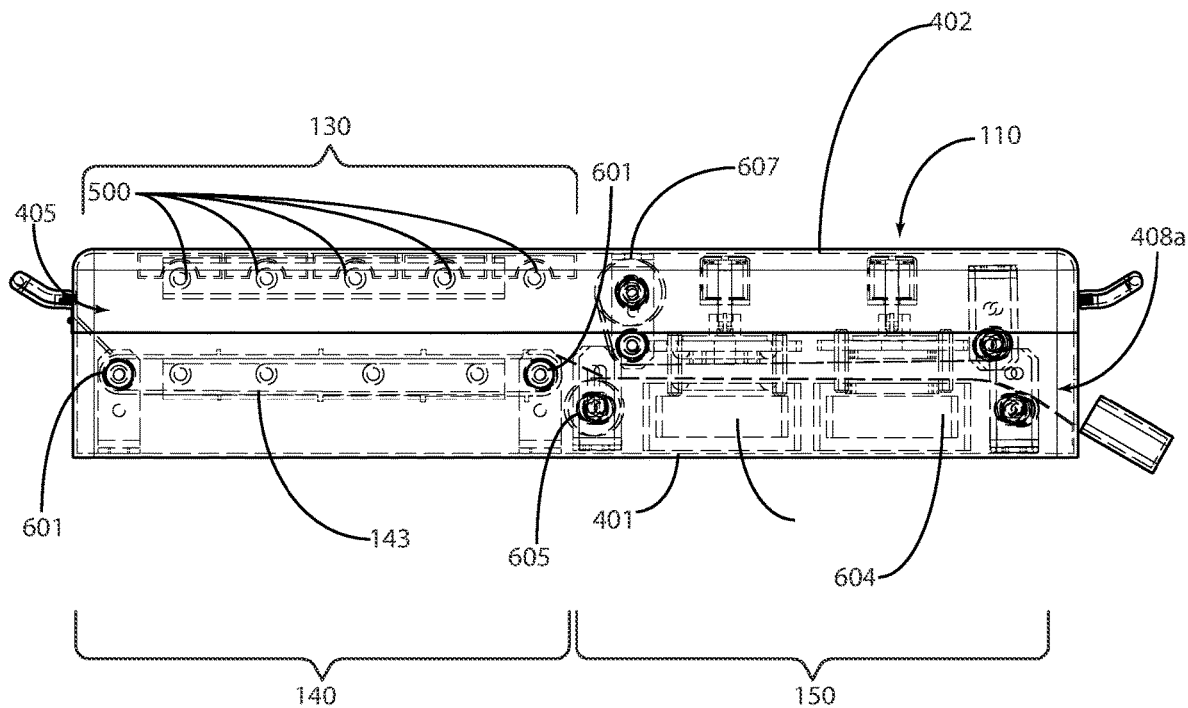

Turning now to the next figure, FIG. 5A-FIG. 5B illustrate a see-through top view and a see-through front view of one embodiment of the present invention. From this view, the different components of the conveyor module 140, sanitizing module 130, and sealing module 150 may be seen from the top and front view. The sealing module 150 may have an upper sealer roll 606 and a lower sealer roll 605 and a mechanism that sever and detach the sealed sanitized objects from the rest of the sealer material. In one exemplary embodiment of the invention, the upper sealer roll 606 and the lower sealer roll 605 may be two rollers placed in the beginning of the sealing module 150 and have the sealing material 407 rolled up around their surface area. The upper sealer roll 606 may be attached before and near the upper sealer die 609, and the lower sealer roll 605 may be attached before and near the lower sealer die 603.

As may be gleaned from these views, in exemplary embodiments, the sanitizing light-emitting sanitizing module 130 may be generally housed on the top shell 401 of enclosure 110 and at a terminal end that includes the inlet 405. The conveyor module 140 may be positioned below the sanitizing light-emitting sanitizing module 130, typically secured to and entirely contained inside the bottom shell 403 of the enclosure 110 and situated opposite to the outlet 408*a* of the bottom shelf 403 of the enclosure 110. Sealing module 150 may be positioned adjacent to the conveyor module 140, situated opposite to the inlet 405 and adjacent to the outlet 408*a* of the bottom shelf 403 of the enclosure 110 in a manner such that the conveyor module 140 is in tandem with the sealing module 150. In exemplary embodiments, the sanitizing light-emitting sanitizing module 130 is secured to and entirely contained inside the bottom shell 403 of the enclosure 110.

Figure 6A:
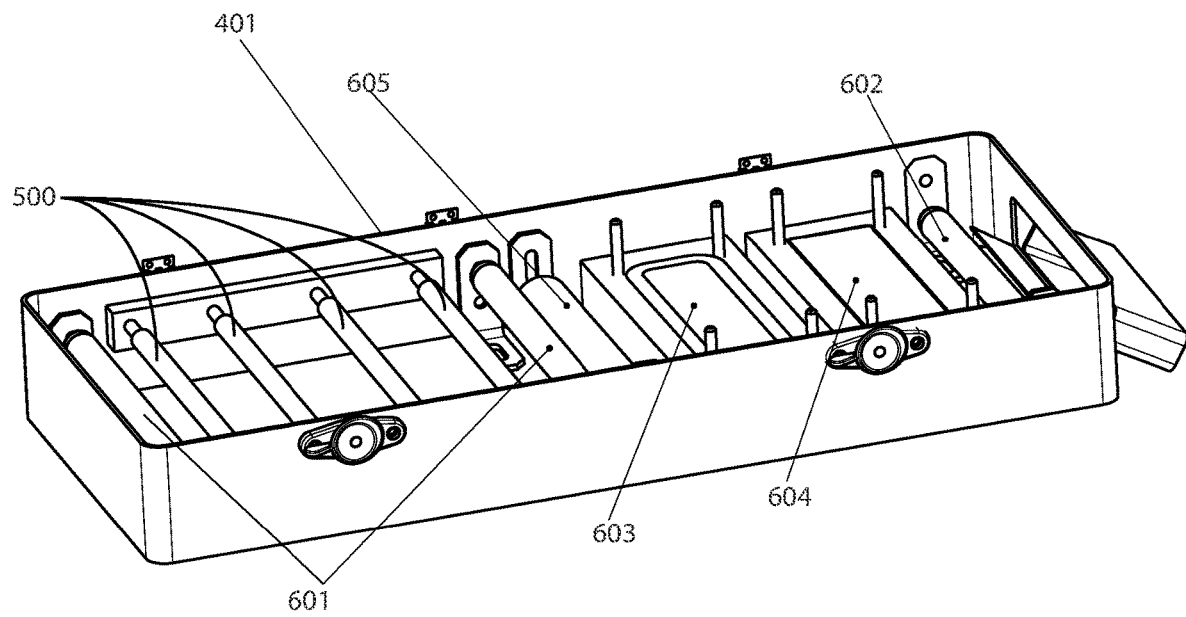
FIG. 6A illustrates the interior view of the bottom shell without a conveyor belt and sealing material.

Turning now to the next figure, FIG. 6A illustrates the interior view of the bottom shell 401 without a conveyor belt 143 and sealing material 407 in accordance with exemplary embodiments of the present invention. From this view, the components on the lower portion of the assembly may be seen. In this embodiment, the sanitizing assembly 100 may have a sealing module 150 and a conveyor module 140 and may not need to be attached to an exterior conveyor belt.

Between the conveyor belt, which is not shown in the illustration, there may exist sanitizing light sources between conveyor belt 131 designed to emit electromagnetic light through the transparent or semi-transparent conveyor belt 143. In one exemplary embodiment, the sanitizing light sources between conveyor belt 131 may have the same specifications as the general sanitizing module 130. Mainly, the sanitizing module 130 may comprise of a light source, circuitry, wiring, and mount for the light source to be fixed between the upper and lower sections of the conveyor belt. Generally, the sanitizing module 130 may be conventional bulbs, filaments, LEDs, mercury-vapor lamps, excimer lamps, or other types of light producing sources.

The sanitizing module 130 may produce light in any wavelength designed to sanitize objects. In one exemplary embodiment, the sanitizing module 130 produce ultraviolet lights between the 100 to 400 nanometer wavelength range. In another exemplary embodiment, the sanitizing module 130 may emit light between the 100 to 300 nanometer wavelength range or the wavelength of a generic germicidal UV light source. In another exemplary embodiment, the sanitizing module 130 may emit light at the UVC wavelength range, which may coincide with the previous exemplary embodiment disclosed herein. Generally, the fluence rate or UV dose rate is in a sufficient range to substantially sterilize the objects being transferred through the conveyor belt 143.

In one exemplary embodiment of the invention, the conveyor drive for conveyor belt 144 that sets the conveyor belt in motion may be motorized. The conveyor drive for conveyor belt 144 may have at least one motorized conveyor roller 601 having a cylindrical shape and installed horizontally between the upper and lower surface of the conveyor belt 143. The motorized conveyor roller 601 may be placed at the beginning or ending portions of the conveyor belt 143 to rotate and provide a pulling or pushing frictional force to the conveyor belt 143 and set it in motion. The circular motion of the motorized conveyor roller 601 translates into the linear motion of the conveyor belt 143 due to the frictional forces between the surfaces. The motorized mechanism may be integrated with the motorized conveyor roller 601, or the roller may be connected to a motor drive that provides the necessary torque. In one exemplary embodiment, the motorized conveyor roller 601 may be programmable to produce a desired torque, rotate at a certain circular velocity, or start and stop when receiving a triggering condition.

The sealing module 150 of the sanitizing assembly 100 may comprise of a sealer die 151, trim die 152, and sealing material roll 153. The sealer die 151 may further comprise of a lower sealer die 603 and an upper sealer die 609.

The lower sealer die 603 may be a plate that outlines the boundary where the sealing material 407 from the sealing material roll 153 would be pressed and sealed. In one exemplary embodiment, the boundary may be outlined by a gap where the upper sealer die 609 presses downwards to seal the sanitized object between the layers of the sealing material 407. In an exemplary embodiment of the invention, the sealing may be done by a heat-sealing process where the sealing material 407 is a thermoplastic. The upper sealer die 609 or lower sealer die 603 may have a heated mechanism where pressing against each other seals the thermoplastic around the sanitized object. In one exemplary embodiment of the invention, the outline of the sealing boundary of the lower sealer die 603 can be adjusted to change shape to adjust to the differing shapes of objects needed to be sealed.

The trim die 152 may be comprised of a lower trim die 604 and upper trim die 610. The lower trim die 604 may be a plate that outlines the boundary for the upper trim die 610 to press and cut the outer boundaries of the sealing around the sanitized objects. In one exemplary embodiment of the invention, the outline of the trimming boundary of the lower trim die 152 can be adjusted to change shape to adjust to the differing shapes of objects needed to be sealed and trimmed.

The sealing material 407 from the sealing material roll 153 may be pulled through the mechanism and get pressed by the sealer die 151 and the trim die 152 and detach from the rest of the sealing material roll 153. The sealer motorized rollers of the conveyor drive for sealing module 144 may be attached at the end of the sealing module 150 to pull the sealing material 407 from the sealing material roll 153 placed in the beginning of the sealing module 150.

Generally, the sealing material roll 153 may comprise of a lower sealer roll 605 and upper sealer roll 606. The lower sealer roll 605 provides the sealing material 407 placed on top the lower sealer die 603 and the lower trim die 604 and under the sanitized object. The lower sealer roll 605 may be pulled by the lower sealer motorized roller 602 through the sealer die 151 and the trim die 152. Generally, any type of sealing material 407 can be used to seal and trim a sanitized object. In an exemplary embodiment of the invention, the sealing material 407 may be thermoplastic used in a heat-sealing process. The thermoplastic used may also be easy to cut and trim.

Figure 6B:
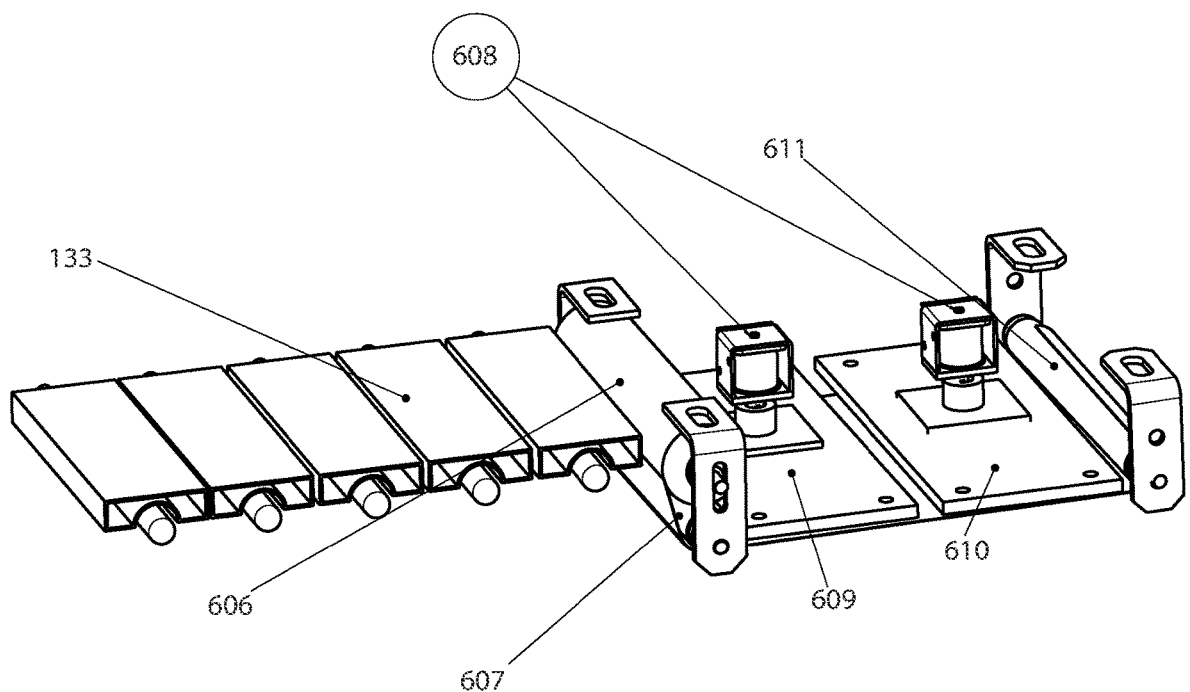
FIG. 6B illustrates the interior view of the top shell and the components it contains.

Turning now to the next figure, FIG. 6B illustrates the interior view of the components secured within the top shell 402 (although the top shell is not shown in this view). From this view, it can be seen that the sanitizing light sources attached inside of bottom shell 401 can be installed on the top or ceiling of the enclosure 110.

In one exemplary embodiment, the sanitizing light sources attached inside of bottom shell 401 may have the same specifications as the general sanitizing module 130. In one exemplary embodiment, the sanitizing module 130 may comprise of a light source, circuitry, wiring, and mount for the light source to be fixed on ceiling of the enclosure. Generally, the light sources may be conventional bulbs, filaments, LEDs, mercury-vapor lamps, excimer lamps, or other types of light producing sources.

The sanitizing module 130 may produce electromagnetic waves in any wavelength designed to sanitize objects. In one exemplary embodiment, the sanitizing module 130 produce ultraviolet lights between the 100 to 400 nanometer wavelength range. In another exemplary embodiment, the sanitizing module 130 may emit light between the 100 to 300 nanometer wavelength range or the wavelength of a generic germicidal UV light source. In another exemplary embodiment, the sanitizing module 130 may emit light at the UVC wavelength range, which may coincide with the previous exemplary embodiment disclosed herein. Generally, the fluence rate or UV dose rate is in a sufficient range to substantially sterilize the objects being transferred through the conveyor belt.

The upper sealer roll 606 may provide the sealing material 407 that covers the top surface of the sanitized object. The sealing material 407 may be rolled around a roller and used for the sealing of the sanitized objects. The upper sealer roll 606 may contacts the surfaces of the upper sealer die 609 and upper trim die 610 that press against the lower sealer die 603 and lower trim die 604, respectively. The upper sealer roll 606 may be pulled by the upper sealer motorized roller 611 through the sealer die 151 and the trim die 152. Generally, the sealing material 407 of the upper sealer roll 606 may be made out of any type of material that can be used to seal and trim sanitized objects. In an exemplary embodiment of the invention, the sealing material 407 may be a thermoplastic material used in a heat-sealing process. The thermoplastic may also be easy to cut and trim.

The upper stabilization conveyor 607 may ensure that the sealing material 407 from the upper sealer roll 606 stays flat and does not wrinkle as the sealing material 407 is pulled through the sealer die 151 and the trim die 152. The upper stabilization conveyor 607 may be a roller or a cylindrical bar that is able to rotate around its longitudinal axis. The upper stabilization conveyor 607 may be placed horizontally before the upper sealer die 609 and below the upper sealer roll 606 to provide support to the sealing material 407 through the sealing module 150. The upper sealer motorized roller 611 may be the receiver of the sealing material 407 that pass through the upper stabilization conveyor 607 by pulling the sealing material 407 towards the exit outlet. In one exemplary embodiment of the invention, the upper stabilization conveyor 607 may be motorized.

The die actuators 608 may be used to set the upper sealer die 609 and upper trim die 610 in downward and upward motion in order to press against the lower sealer die 603 and the lower trim die 604 to seal and trim the sanitized objects. In one exemplary embodiment of the invention, the die actuators 608 may be programmable to operate at a certain frequency, timing, or determine the amount of applied force to the upper sealer die 609 and the upper trim die 610 to press against the lower sealer die 603 and the lower trim die 604.

The upper sealer die 610 may press against the lower sealer die 603 to seal the sanitized objects that are placed in between the two plates. The upper sealer die 601 may be a plate that outlines the boundary where the sealing material 407 would be pressed and sealed. In one exemplary embodiment of the invention, the upper sealer die 610 may have sealing edges extending outwards from the plate that outline the sealing boundary. The pressing of the upper sealer die 610 to the lower sealer die 603 may seal the material around the boundary of the sanitized object. In an exemplary embodiment of the invention, the sealing may be done by a heat-sealing process where the sealing material 407 used is a thermoplastic. The upper sealer die has a spongy platen attached to its underside that forces the air out between the two rollers as the sealer is activated. Either the upper sealer die 610 or lower sealer die 603 may have a heated mechanism where pressing against each other seals the thermoplastic around the sanitized object. In one exemplary embodiment of the invention, the outline of the sealing boundary of the upper sealer die 610 can change shape to adjust to the differing shapes of objects needed to be sealed.

The upper trim die 610 may be designed to press against the lower trim die 604 to cut a perimeter around the sealed object to detach it from the rest of the sealer roll. In one exemplary embodiment of the invention, the upper trim die 610 may be a plate that has sharp edges extending outwards, which outlines the boundary of where the sealing material may be cut. As a result, when the upper trim die 610 is pressed against the lower trim die 604, the sealing material may be cut around the sealed object. In one exemplary embodiment of the invention, the outline of the trimming boundary of the upper trim die 610 can change shape to adjust to the differing shapes of objects needed to be sealed and trimmed.

Generally, after the sanitized object goes through the sealer die 151 and the trim die 152, the object may reach the exit outlet of the assembly in any manner. In one exemplary embodiment of the invention, when the sanitized instrument is cut from the sealing material roll 153, the remaining sealing material 407 of the sealing material roll 153 along with the next sealed instrument push the trimmed object towards the exit outlet of the sanitization assembly device. In one exemplary embodiment of the invention, the sealing material roll 153 may be comprised of a lower sealer roll 605 and an upper sealer roll 606 that are attached to motorized sealer rollers, which pull the sealing material roll 153 to create the pushing force of the remaining sealing material and the next sealed instrument in moving the trimmed sealed object towards the exit outlet of the apparatus. The motorized sealer rollers may be comprised of lower sealer motorized roller 602 and upper sealer motorized roller 611.

The sealer motorized rollers, which comprise of the upper sealer motorized roller 611 and the lower sealer motorized roller 602, may help in moving the sealing material roll 153 through the sealing module 150. The upper sealer motorized roller 611 pulls the sealing material 407 of the upper sealer roll 606 that covers the top surface of the sanitized object through the sealer die 151 and the trim die 152. The lower sealer motorized roller 602 pulls the sealing material 407 of the lower sealer roll 605 that covers the bottom surface of the sanitized object through the sealer die 151 and the trim die 152.

In one exemplary embodiment of the invention, the sealer motorized rollers may have a cylindrical shape and be placed horizontally near the exit outlet to rotate about their longitudinal axis and pull the sealing material 407 of the sealing material roll 153. The sealer motorized rollers may have the motorized rotational drive component integrated in the rollers or be connected to a motor drive that provides the necessary torque. In one exemplary embodiment, the sealer motorized rollers may be programmable to pause motion in order to allow the sealer die 151 and the trim die 152 to seal and trim the sanitized object.

A sanitizing assembly in accordance with the present invention provides numerous advantages inadequately addressed, or not addressed at all, by the prior art. For example, in some exemplary embodiments, a pass-thru sanitization system is provided. Moreover, embodiments of the present invention easily installs on top of existing conveyors and may be integrated into pre-existing operations in retail environments. A system requires no modifications to the existing store's conveyor, except for tapping into the store conveyor's power source (for example, at the pedal that the checkout person steps on to move the conveyor). In some exemplary embodiments, the inclusion of electricity generating armatures that are attached to and concentric with the device's conveyor system rollers (driven by the torque generated by the store's conveyor) may be employed to charge a battery that powers the lighting system, thereby creating a "plug and play" capability that requires no modifications at all to the current store conveyor.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into other similar systems. That is, at least a part of the devices and/or processes described herein may be integrated into an airway interface system via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

An apparatus describing a sanitizing device that transports and exposes objects to a plurality of sanitizing light sources inside an enclosure has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A sanitizing assembly, comprising:
    a modular enclosure with an inlet and an outlet opposite longitudinal ends of the enclosure, the enclosure including a top shell coupled to a bottom shell;
    a conveyor module secured to and entirely contained inside the bottom shell of the enclosure, including a conveyor belt adapted to move objects between the inlet and the outlet of the enclosure;
    a conveyor interface removably coupled to the conveyor module inside modular enclosure and adapted to interface with an external conveyor system of a cash register such that the conveyor module is secured on top of an exterior frame of the external conveyor system of the cash register, the conveyor interface situated below the conveyor module and including at least one support channel housing one or more conveyor wheels adapted to contact a surface of a conveyor belt of the external conveyor system of the cash register and translate a motion of the exterior conveyor belt to the conveyor belt of the conveyor module, the conveyor interface adapted to drive the conveyor belt of the conveyor module in the same direction as the external conveyor system of the cash register using force exerted by the external conveyor system of the cash register in a manner that integrates the sanitizing assembly with the existing external conveyor system of the cash register without requiring modifications or disrupting an original conveyor flow of the existing external conveyor system of the cash register;
    a conveyor support subassembly that includes springs or actuators for adjusting a desired pressure or force sandwiching the conveyor support subassembly with the external conveyor system of the cash register, and
    a light-emitting module secured to and entirely contained inside the enclosure, the light-emitting module adapted to disperse a sanitizing light onto the objects moved between the inlet and the outlet of the enclosure.

2. The sanitizing assembly of claim 1, wherein the light-emitting module includes a plurality of sanitizing light-emitting lamps situated on the top shell of the enclosure and above the conveyor belt of the conveyor module.

3. The sanitizing assembly of claim 1, wherein the light-emitting module includes a plurality of sanitizing light-emitting lamps situated on the bottom shell of the enclosure and below the conveyor belt of the conveyor module.

4. The sanitizing assembly of claim 1, wherein the light-emitting module includes a plurality of sanitizing light-emitting lamps situated on the top shell of the enclosure and directly above the conveyor belt of the conveyor module or on the bottom shell of the enclosure and directly below the conveyor belt of the conveyor module.

5. The sanitizing assembly of claim 4, wherein the conveyor belt comprises a transparent or semi-transparent material to allow the light produced by the sanitizing light-emitting module to hit the objects.

6. The sanitizing assembly of claim 1, wherein the conveyor support subassembly is C-shaped.

7. The sanitizing assembly of claim 1, further comprising a light-containment shroud at the inlet of the enclosure.

8. The sanitizing assembly of claim 1, wherein the conveyor interface comprises a conveyor exit apron.

9. The sanitizing assembly of claim 1, wherein the conveyor belt is a cleated belt.

10. The sanitizing assembly of claim 1, wherein the conveyor belt comprises a mesh.

11. The sanitizing assembly of claim 1, wherein the conveyor interface is coupled to a portion of the enclosure.

12. The sanitizing assembly of claim 1, wherein the external conveyor system is a conveyor system of a cash register.

13. A sanitizing assembly, comprising:
    a cash register system including a counter and an external conveyor system that drives the sanitizing assembly installed on top of the external conveyor system, and a cash register, wherein the external conveyor system is a conveyor system of the cash register;
    a modular enclosure with an inlet and an outlet opposite longitudinal ends of the enclosure, the enclosure including a top shell coupled to a bottom shell;
    a conveyor module secured to and entirely contained inside the bottom shell of the enclosure, including a conveyor belt adapted to move objects between the inlet and the outlet of the enclosure, the conveyor belt including a transparent or semi-transparent surface to allow the light produced by the sanitizing light-emitting module to hit the objects;
    a conveyor interface removably coupled to the conveyor module inside the modular enclosure and adapted to interface with the external conveyor system of the cash register such that the conveyor module is secured on top of an exterior frame of the external conveyor system of the cash register, the conveyor interface situated below the conveyor module and including a first support channel along a first length of the enclosure and a second support channel along a second length of the enclosure, the first and second channels on opposite sides of a length of the conveyor belt of the conveyor module, each of the first and second channels housing one or more conveyor wheels adapted to contact a surface of a conveyor belt of the external conveyor system of the cash register and translate the motion of the exterior conveyor belt to the conveyor belt of the conveyor module, the conveyor interface adapted to drive the conveyor belt of the conveyor module in the same direction as the external conveyor system using force exerted by the external conveyor system of the cash register in a manner that integrates the sanitizing assembly with the existing external conveyor system of the cash register without requiring modifications or disrupting an original conveyor flow of the existing external conveyor system of the cash register;

a conveyor support subassembly that includes springs or actuators for adjusting a desired pressure or force sandwiching the conveyor support subassembly with the external conveyor system of the cash register, and a light-emitting module secured to and entirely contained inside the enclosure, the light-emitting module adapted to disperse a sanitizing light onto the objects moved between the inlet and the outlet of the enclosure, wherein the light-emitting module includes:

a plurality of sanitizing light-emitting lamps situated on the top shell of the enclosure and directly above the conveyor belt of the conveyor module or on the bottom shell of the enclosure and directly below a portion of the conveyor belt of the conveyor module.

14. The sanitizing assembly of claim 13, wherein the conveyor support subassembly is C-shaped.

15. The sanitizing assembly of claim 13, further comprising a light-containment shroud at the inlet of the enclosure.

16. The sanitizing assembly of claim 13, wherein the conveyor interface comprises a conveyor exit apron.

17. A sanitizing assembly, comprising:

a modular enclosure with an inlet and an outlet opposite longitudinal ends of the enclosure, the enclosure including a top shell coupled to a bottom shell;

a conveyor module secured to and entirely contained inside the bottom shell of the enclosure, including a conveyor belt adapted to move objects between the inlet and the outlet of the enclosure;

a conveyor interface removably coupled to the conveyor module inside the modular enclosure and adapted to interface with an external conveyor system of a cash register, the conveyor interface adapted to drive the conveyor belt of the conveyor module from a force exerted by the external conveyor system of the cash register in a manner that integrates the sanitizing assembly with the existing external conveyor system of the cash register without requiring modifications or disrupting an original conveyor flow of the existing external conveyor system of the cash register;

a conveyor support subassembly that includes springs or actuators for adjusting a desired pressure or force sandwiching the conveyor support subassembly with the external conveyor system of the cash register, and a light-emitting module secured to and entirely contained inside the enclosure, the light-emitting module adapted to disperse a sanitizing light onto the objects moved between the inlet and the outlet of the enclosure.

* * * * *